United States Patent
Mizuno

(10) Patent No.: US 12,135,906 B2
(45) Date of Patent: Nov. 5, 2024

(54) IMAGE PROCESSING APPARATUS THAT STORES DATA INCLUDING A TOKEN, CONTROL METHOD OF IMAGE PROCESSING APPARATUS, AND RECORDING MEDIUM

(71) Applicant: CANON KABUSHIKI KAISHA, Tokyo (JP)

(72) Inventor: Takafumi Mizuno, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 18/352,591

(22) Filed: Jul. 14, 2023

(65) Prior Publication Data

US 2024/0028271 A1    Jan. 25, 2024

(30) Foreign Application Priority Data

Jul. 19, 2022    (JP) ................................. 2022-114723

(51) Int. Cl.
*G06F 3/12* (2006.01)
*H04L 9/32* (2006.01)

(52) U.S. Cl.
CPC ............ *G06F 3/121* (2013.01); *G06F 3/1207* (2013.01); *G06F 3/1234* (2013.01); *G06F 3/1238* (2013.01); *H04L 9/3213* (2013.01)

(58) Field of Classification Search
CPC ...... G06F 3/121; G06F 3/1207; G06F 3/1234; G06F 3/1238; H04L 9/3213; H04L 9/0894

See application file for complete search history.

(56) References Cited

U.S. PATENT DOCUMENTS

| | | | |
|---|---|---|---|
| 9,646,151 B2 * | 5/2017 | Miyakawa | ............... G06F 21/31 |
| 2005/0073665 A1 * | 4/2005 | Taniguchi | ............... G03B 27/42 |
| | | | 355/53 |
| 2015/0201091 A1 * | 7/2015 | Yokoyama | ......... H04N 1/00307 |
| | | | 358/1.15 |
| 2020/0319831 A1 * | 10/2020 | Kobana | ................. G06F 3/1238 |

FOREIGN PATENT DOCUMENTS

JP    2016143164 A    8/2016

* cited by examiner

*Primary Examiner* — Juan M Guillermety
(74) *Attorney, Agent, or Firm* — ROSSI, KIMMS & McDOWELL LLP

(57) ABSTRACT

An image processing apparatus stores data including a transmission destination to which an image generated by the scanner is to be transmitted and a token that is used for storing the image in the transmission destination and attempt to transmit an image generated by the scanner to a transmission destination included in the data, using the token, in response to an instruction from a user. If the transmission fails, the image processing apparatus provides a notification about an error notification including information for causing authentication for reacquisition of a token to a client terminal, receive a token reacquired according to the authentication from the client terminal, and attempt to transmit an image generated by the scanner to the transmission destination included in the data by using the reacquired token.

8 Claims, 31 Drawing Sheets

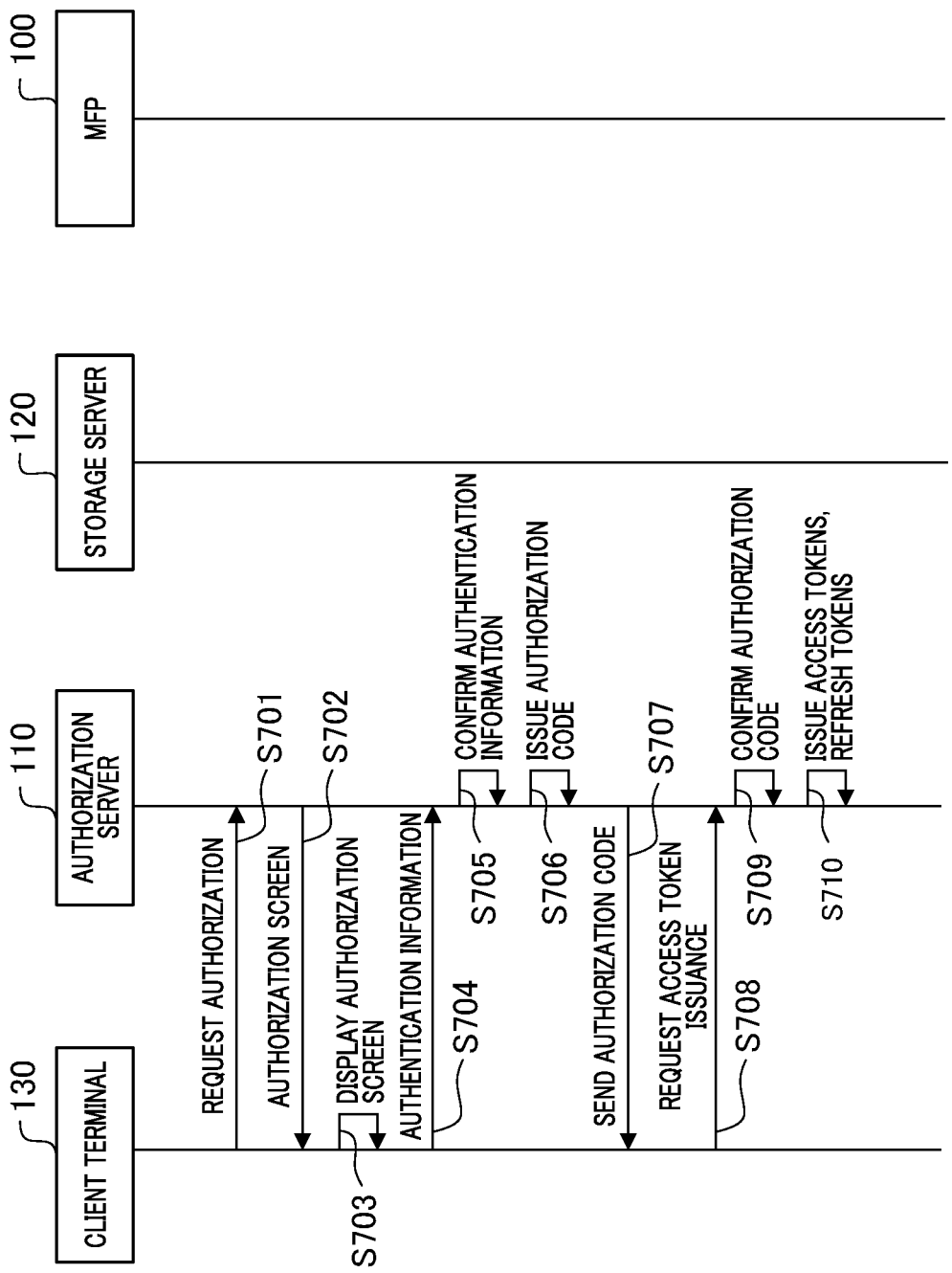

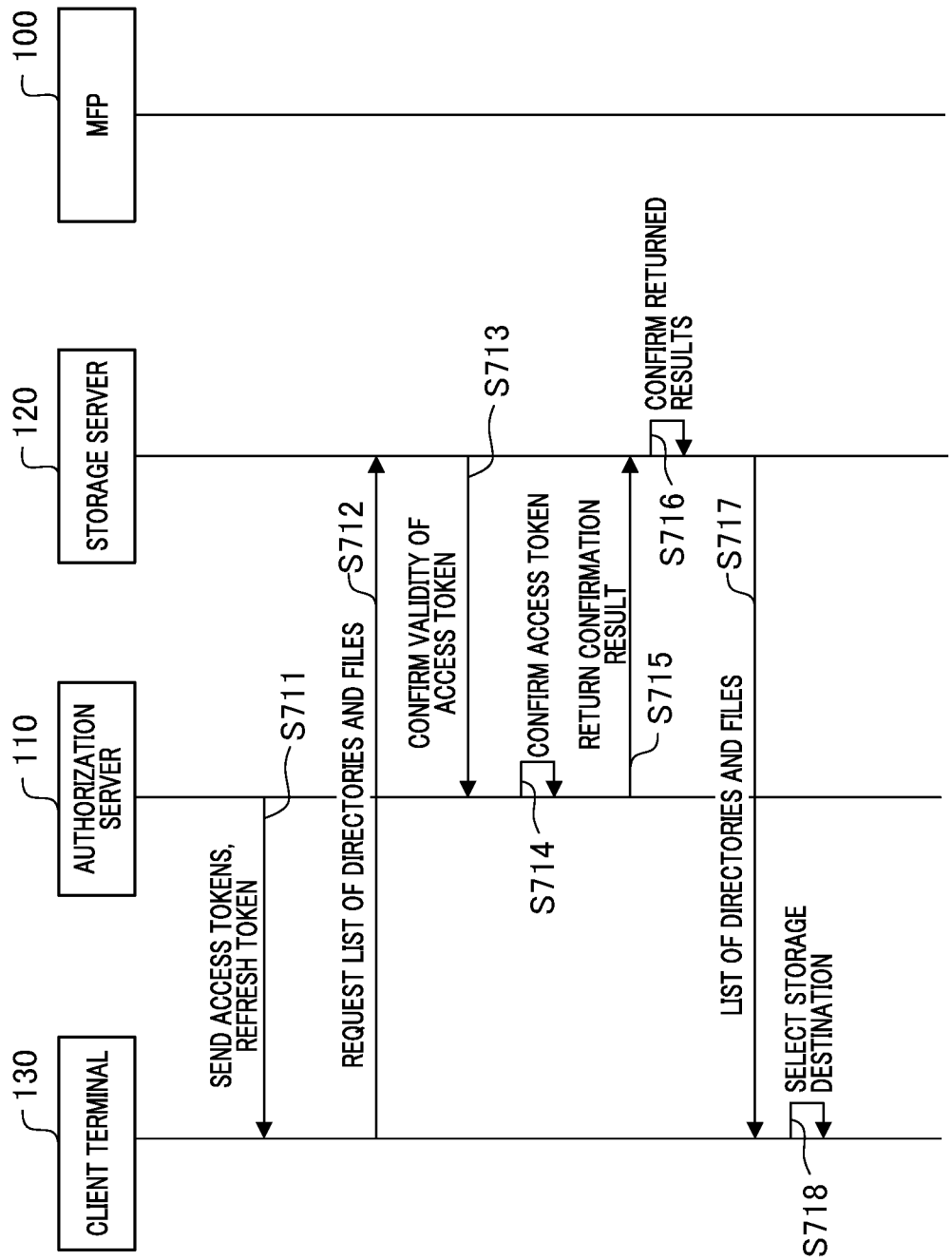

FIG. 8

| | Reservation scan settings | | |
|---|---|---|---|
| 801 — | Scan settings | | |
| | Reading size | A3 ▼ | |
| | Color | Full color ▼ | |
| | File type | PDF ▼ | |
| 802 — | Storage destination | | 804 |
| | Server  storageA | | |
| | Path  keiyaku¥20220501 | | Select path |
| 803 — | Name | Contract scan | |
| | | OK | Cancel |

FIG. 9

| Scan settings | Storage destination | Name | Access token | Scan ID |
|---|---|---|---|---|
| A3、Full color、PDF | storageA(172.16.8.24) keiyaku¥202200501 | Contract scan | abcd1234xy | 241895 |
| ⋮ | ⋮ | ⋮ | ⋮ | ⋮ |

1001 — Reservation scan application is requesting the following authority from storageA.
・See directory
・Store file
Approved?

1002 — Username

1003 — Password

Yes    No

FIG. 13

```
┌─────────────────────────────────────────────────────────────────┐
│ Reservation scan                                                │
├─────────────────────────────────────────────────────────────────┤
│                                                                 │
│  Please confirm the contents of the reservation scan job and input scan ID │
│                   ─1301                                         │
│     Name: Contract scan                                         │
│                              ─1304                              │
│       Scan settings  │Change settings│                          │
│   1302─   Reading size: A3                                      │
│           Color: Full color                                     │
│           File type: PDF                                        │
│                                                                 │
│         Storage destination                                     │
│   1303─   Server   storageA                                     │
│           Path     keiyaku¥20220501                             │
│                                                                 │
│        Scan ID    ┌──────────────────┐                          │
│   1305─           └──────────────────┘                          │
│                                          ┌──────┐  ┌──────┐     │
│                                          │ Scan │  │Return│     │
│                                          └──────┘  └──────┘     │
│                                             1306      1307      │
└─────────────────────────────────────────────────────────────────┘
```

FIG. 16

| Reservation scan job ID | Destination | Image file |
|---|---|---|
| 182519 | storageA(172.16.8.24) keiyaku¥202200501 | errjob¥182519¥abc.pdf |
| ⋮ | ⋮ | ⋮ |

FIG. 23

| Error reason | Eerror recovery criterion | Estimated time |
|---|---|---|
| Network disconnected | Long hours | 3h |
| Directory does not exist | No possibility of recovery | – |
| Temporary conflict | Short time | 5min |
| . . . | . . . | . . . |

To yamada@foo.com
Subject Reservation scan failed

Failed to store the reservation scan on the following server performed at 10:51 on 1 May 2022.

storageA(172.16.8.24)
keiyaku¥202200501

Please access the following URL to obtain the image file.

¥¥mfp001¥errjob¥182519¥abc.pdf

FIG. 25

| Reservation scan settings | | |
|---|---|---|
| Scan settings | | |
| Reading size | A3 | ▼ |
| Color | Full color | ▼ |
| File type | PDF | ▼ |

Storage destination
- Server: storageA
- Path: keiyaku¥20220501  [Select path]

Name: Contract scan

☑ Store image file when error occurs

Email address: yamada@foo.com

[OK]  [Cancel]

Labels: 801 (Scan settings), 802 (Storage destination), 803 (Name), 804 (Select path), 2201 (Store image file when error occurs), 2202 (Email address)

IMAGE PROCESSING APPARATUS THAT STORES DATA INCLUDING A TOKEN, CONTROL METHOD OF IMAGE PROCESSING APPARATUS, AND RECORDING MEDIUM

BACKGROUND OF THE INVENTION

Field of the Invention

The present invention relates to an image processing apparatus having a function of performing error recovery for storage on a storage server, a control method of the image processing apparatus, and a recording medium.

Description of the Related Art

In recent years, storage servers such as cloud have increasingly been used as storage destinations of images scanned by an image forming apparatus (image processing apparatus). Access to the storage server is performed using an access token by, for example, authorization of authority such as OAuth 2.0 defined by RFC (Request for Comments), instead of authorization by a username and a password.

Additionally, there is an image forming apparatus capable of performing reservation scan processing. In the case in which the reservation scan processing is performed, a reservation scan job including a scan setting, a storage destination of a storage server, and an access token for accessing the storage server is generated on, for example, the client terminal. Subsequently, the reservation scan job is input to the image forming apparatus, and thereby the scan setting in the image forming apparatus is simplified. The client terminal here is a PC, a smart phone, and the like. Additionally, in the image forming apparatus, a document can be stored in a desired storage server by desired settings, simply by setting a document and executing a reservation scan job that has been input from the client terminal.

In such a system, the access token has an expiration date/time, which is generally set to a short time. Additionally, access authentication for a cloud service is performed on an image data processing server and, information indicating whether or not a remaining time before the expiration date/time of the access token that has been issued on the image data processing server is less than a predetermined threshold can be determined is transmitted to the client terminal. In such a system, there is a technology in which the remaining time before the expiration date/time of the access token can be determined on the client terminal and an access token issuance request can be performed on the client terminal (please refer to Japanese Patent Application Laid-Open No. 2016-143164).

However, in the system as described above, the storage server serves as a transmission destination, and an error may occur in transmission for storage in the transmission destination. In this case, there are cases in which the access token may have expired even if retransmission of a reservation scan job is attempted after the error is eliminated. In such a case, the access token is invalid, and storage in the storage server may fail.

SUMMARY OF THE INVENTION

The present invention has been made in view of the circumstances described above. When an error occurs in transmission to a transmission destination, error recovery is performed, and consequently, the convenience of an image processing apparatus is improved.

An image processing apparatus according to the present invention is an image processing apparatus provided with a scanner, the image processing apparatus comprising: a memory storing instructions; and a processor executing the instructions causing the image processing apparatus to: store data including a transmission destination to which an image generated by the scanner is to be transmitted and a token that is used for storing the image in the transmission destination; attempt to transmit an image generated by the scanner to a transmission destination included in the data, using the token, in response to an instruction from a user; execute an error notification including information for causing authentication for reacquisition of a token if the transmission fails; receive a token reacquired according to authentication according to the error notification, from a client terminal; and attempt to transmit an image generated by the scanner to the transmission destination included in the data, by using the reacquired token.

Further features of the present invention will become apparent from the following description of exemplary embodiments (with reference to the attached drawings).

BRIEF DESCRIPTION OF THE DRAWINGS

FIGS. 7A and 7B are sequence diagrams in which the client terminal sets a storage destination of a storage server.

FIG. 8 is a diagram showing an example of a reservation scan setting screen that is displayed on a reservation scan application of the client terminal.

FIG. 9 is a diagram showing an example of a reservation scan job setting.

FIG. 10 is a diagram showing an example of an authorization screen.

FIG. 16 is a diagram that shows an example of a list of error reservation scan jobs.

FIG. 23 is a diagram showing an example of an error determination table.

FIG. 24 is a diagram showing an example of texts of an email sent when an error occurs in storage on a storage server.

FIG. 25 is a diagram showing an example of a reservation scan setting screen that is displayed on the client terminal in the second embodiment.

DESCRIPTION OF THE EMBODIMENTS

First Embodiment

Hereinafter, the embodiments of the present invention will be explained below based on drawings. However, not all the features described in the embodiments are necessarily essential to the means for solving the present invention. In the embodiment of the present invention, an example of a service in which a client terminal, for example, an image forming apparatus, a PC (personal computer) and a smartphone, an authorization server, and a storage server are linked will be explained.

Figure 1:
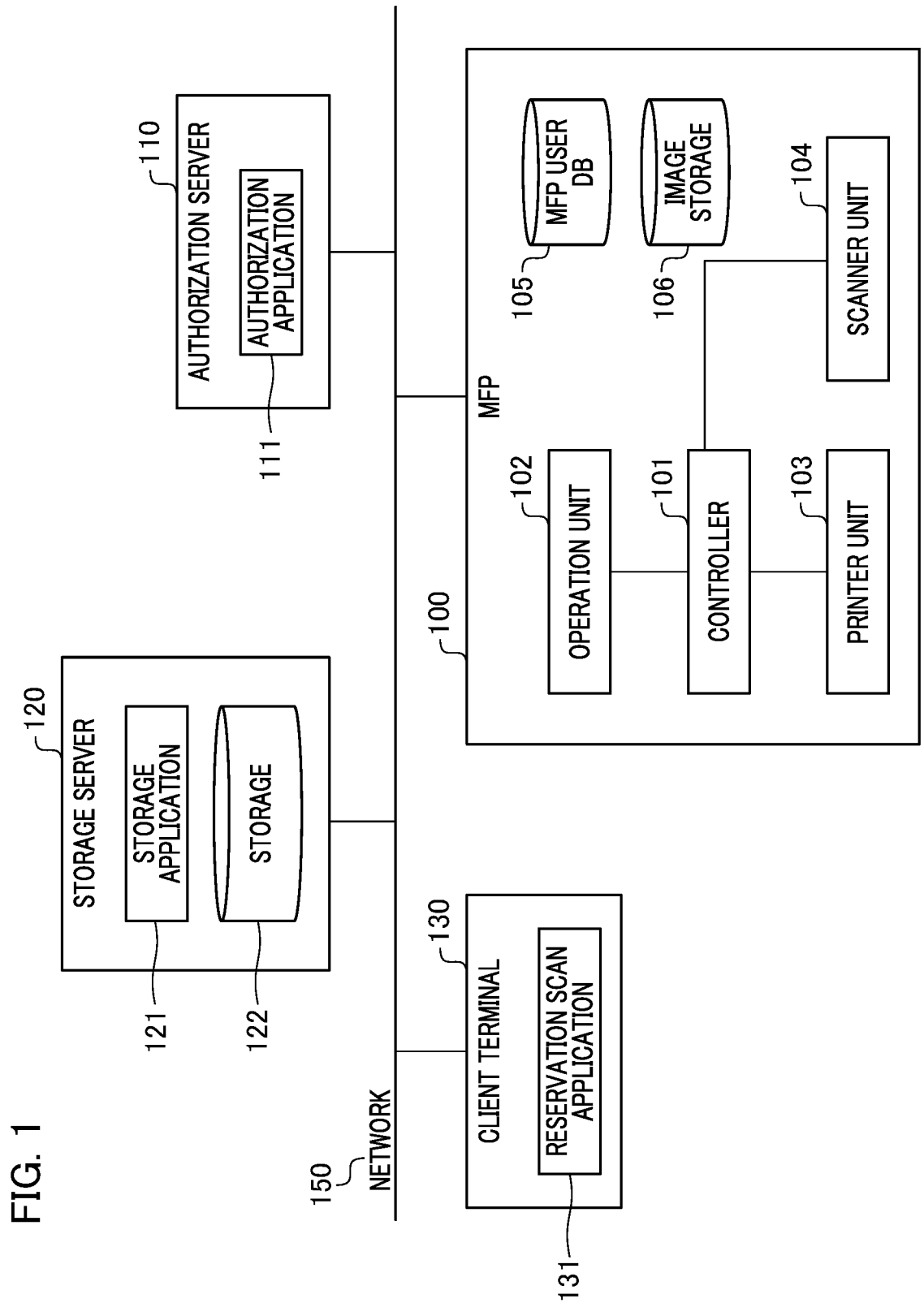
FIG. 1 shows an example of a system configuration of the present embodiment.

FIG. 1 shows an example of a system configuration of the present embodiment. The system in the present embodiment is configured by an MFP 100, an authorization server 110, a storage server 120, and a client terminal 130. The MFP 100, the authorization server 110, the storage server 120, and the client terminal 130 are connected via a network 150.

The network 150 may be either a wired connection or a wireless connection, and may be either the Internet or an intranet. For example, the network 150 may be a wireless connection, WiFi, or a data communication line, and may be in any form if data can be exchanged. Note that the MFP 100, the authorization server 110, the storage server 120, and the client terminal 130 may not necessarily all be of the same network type. For example, the MFP 100, the authorization server 110, and the storage server 120 may be wired and connected by the Internet, and the client terminal 130 may be connected by a data communication line.

The MFP 100 has the function of an image forming apparatus and reads images with a scanner and prints images with a printer. MFP is an abbreviation for "Multi Function Peripheral". The MFP 100 has an operation unit 102 that performs input/output with a user. The MFP 100 has a printer section 103 that outputs electronic data to a paper medium. The MFP 100 has a scanner section 104 that reads a paper medium and converts it into electronic data.

The operation unit 102, the printer section 103, and the scanner section 104 are connected to a controller section 101, and functioning as a multi function peripheral is realized according to the control of the controller section 101. The MFP 100 has an MFP user DB 105 in which MFP user information for performing authentication when using the MFP 100 is stored. The MFP 100 has an image storage 106 consisting of a temporary region and a long-term storage region where image data are mainly stored. In the temporary region, the temporary image data such as data to be used by the printer section 103 and data that has been converted by the scanner section 104 is stored. In the long-term storage region, image data that needs to be stored for a time-period longer than the temporary region is stored.

The authorization server 110 is configured by including an authorization application 111. An example in which the authorization application 111 follows the mechanism of OAuth defined by RFC6479 is shown. When the client terminal 130 requests access to the storage server 120 along with appropriate authentication information, the authorization application 111 issues an access token for providing access authority to the storage server 120.

Additionally, when the client terminal 130 passes the access token to the storage server 120 and performs an access request, the validity of the access token is confirmed from the storage server 120 to the authorization server 110. At this time, the authorization application 111 determines whether or not the access token is valid.

Additionally, since access tokens generally have a short expiration date/time, the authorization application 111 may issue a refresh token having a longer expiration date/time in order to update the access token. When a request to update the access token is issued with the refresh token from the client terminal 130, the authorization application 111 performs reissuance of the access token, and the refresh token and returns them to the client terminal 130. Note that OAuth is one example, and authorization and authentication may be performed by other methods. Since the authorization server 110 is configured by well-known technology, detailed explanations will be omitted.

The storage server 120 is configured by including a storage application 121 and a storage 122. On receipt of instructions from the client terminal 130, the storage application 121 performs returning a list of files and directories stored in the storage 122, storing the file on the storage 122, and the like. The storage application 121 receives the access token from the client terminal 130, confirms with the authorization server 110 whether or not the access token is valid, and rejects the access if the access token is not valid. Since the storage server 120 is configured by well-known technology, the detailed explanation will be omitted. The storage server 120 in the present embodiment is an example of a transmission destination to which images generated by a scanner are transmitted. Additionally, the access token is an example of a token used to store images at a transmission destination.

The client terminal 130 is configured by including a reservation scan application 131. Although, in FIG. 1, only one client terminal 130 is present, a plurality of client terminals may be present. The reservation scan application 131 performs scan settings for performing a scan in the MFP 100, sets a storage destination of the scanned image file, and instructs the MFP 100 to issue a reservation scan job. Examples of the client terminals include a smartphone, a tablet, a PC, and the like. Note that, in FIG. 1, only the configuration for explaining the present embodiment is described, and other configurations may be included if implementation of the present invention can be satisfied, and the connection form between each component is also, of course, not limited thereto.

Figure 2:
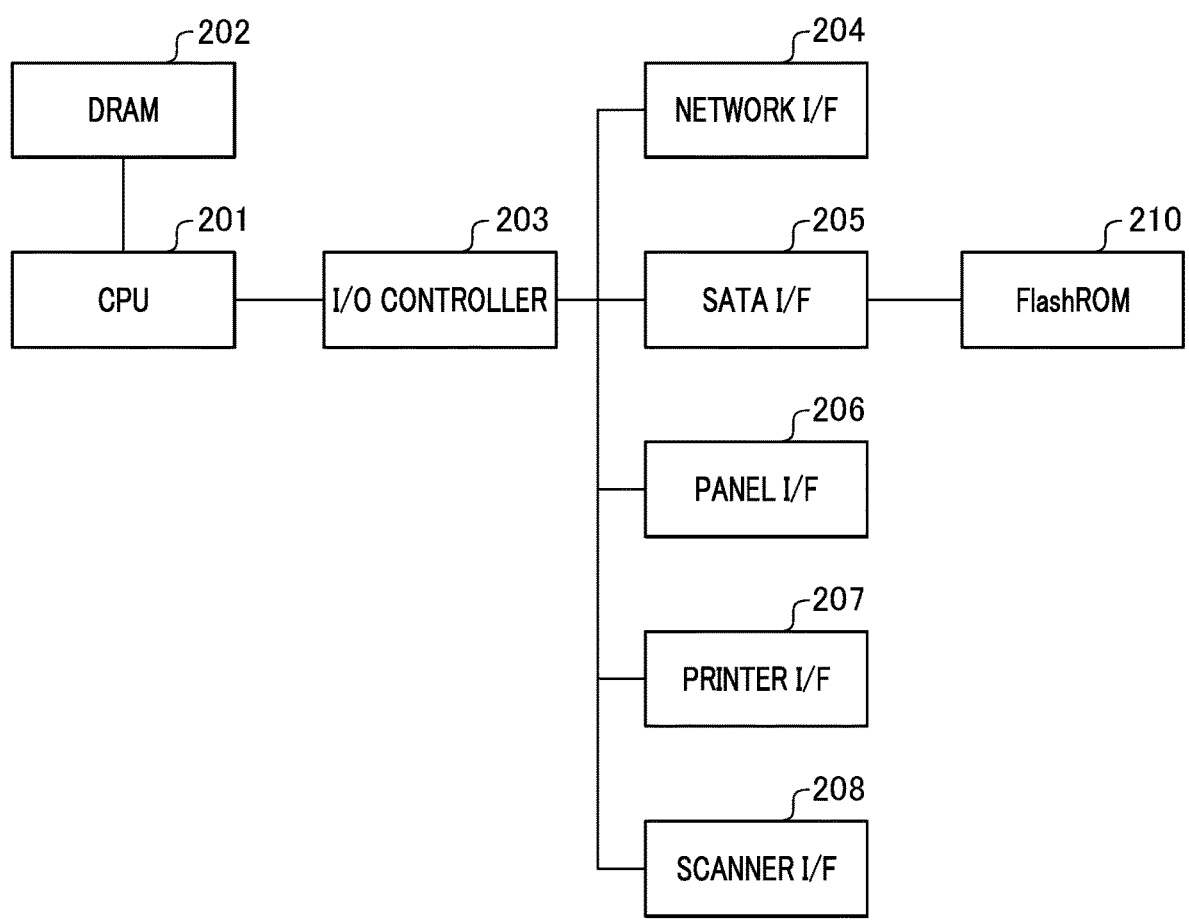
FIG. 2 is a block diagram showing details of a controller section of an MFP.

FIG. 2 is a block diagram showing details of the controller section 101 of the MFP. A CPU 201 performs the main calculation processing in the controller. The CPU 201 is connected to the DRAM 202 via a bus. A DRAM 202 is used by the CPU 201 to serve as a working memory for temporarily locating a program data indicating a calculation instruction in the process of calculation performed by the CPU 201 and data to be processed. The CPU 201 is connected to the I/O controller 203 via the bus. The I/O controller 203 performs input/output to and from various devices according to the instructions of the CPU 201.

A SATA (Serial Advanced Technology Attachment) I/F 205 is connected to the I/O controller 203, and a Flash ROM 210 is connected to the SATA I/F 205. The CPU 201 uses the Flash ROM 210 to permanently store programs for realizing the function of the MFP and document files. Instead of the Flash ROM, a large capacity storage device including an HDD may be connected.

A network I/F 204 is connected to the I/O controller 203. A wired LAN device and a wireless LAN device are connected to the network I/F 204. The CPU 201 realizes communication on the network 150 by controlling the wired LAN device and the wireless LAN device via the network I/F 204.

A panel I/F 206 is connected to the I/O controller 203. The CPU 201 realizes input/output for users to the operation unit 102 via the panel I/F 206.

A printer I/F 207 is connected to the I/O controller 203. The CPU 201 realizes output processing of paper media using the printer section 103 via the printer I/F 207.

In the MFP 100, various applications for using the functions of the MFP are present. As an example, there are a copy function, a transmission function, a fax function, a box function, and the like. For example, in the case of performing a copy function, the CPU 201 reads program data from the Flash ROM 210 into the DRAM 202 via the SATA I/F 205. The CPU 201 detects a copy instruction from a user to the operation unit 102 via the panel I/F 206 according to a program that has been read into the DRAM 202. When the CPU 201 detects a copy instruction, it receives a document as electronic data from the scanner section 104 via a scanner I/F 208, and stores the electronic data in the DRAM 202. The CPU 201 performs, for example, color conversion processing that is suitable for output on image data that has been stored in the DRAM 202. The CPU 201 transfers image data stored in the DRAM 202 to the printer section 103 via the printer I/F 207, and performs output processing on a paper medium.

In the transmission function, the processing in which the CPU 201 detects a transmission instruction from a user is the same as the copy function described above. The transmission instruction includes a transmission protocol, destination specification, image format, and the like from a user. The transmission protocol is, for example, SMB and FTP, and transmission destination specification is specified by, for example, UNC (Universal Naming Convention). The image format is JPEG, PDF, and the like. When the CPU 201 detects a transmission instruction, it receives the document as electronic data from the scanner section 104 via the scanner I/F 208, and stores the electronic data in the DRAM 202. The CPU 201 performs, for example, image format conversion that has been specified by a user on the image data stored in the DRAM 202. The CPU 201 transfers the image data stored in the DRAM 202 to a transmission destination by using a protocol specified by the user via the network I/F 204. The CPU 201 may specify the storage server 120 as a transmission destination and perform transmission using an authorization mechanism in which an access token is used.

In the fax function, the processing in which the CPU 201 detects a fax instruction from a user is the same as the copy function as described above. When the CPU 201 detects the fax instruction, it receives the document as electronic data from the scanner section 104 via the scanner I/F 208 and stores the electronic data in the DRAM 202. The CPU 201 performs image format conversion for fax on image data stored in the DRAM 202. The CPU 201 transfers image data stored in the DRAM 202 to a telephone number of a fax and the like that has been specified by the fax instruction via a telephone line network (not illustrated) or the like to which the fax I/F 209 is connected. A fax using a telephone line is an example, and an internet fax may also be used.

The box function has a function of storing scanned images in a storage region that is inside the MFP 100 or on a memory medium that is connected to the MFP 100. The box function has a function of making public of images that are stored in the MFP 100 to an external PC and other MFPs (not illustrated), in which the MFP 100 serves as a file server. In the box function, the processing in which the CPU 201 detects a box storage instruction from the user is the same as the copy function described above. The box storage instruction includes storage destination specification from the user, an image format, and the like. The storage destination is the storage located inside the MFP 100 or the path to the memory medium that is connected to the MFP 100. The image format is JPEG, PDF, and the like. When the CPU 201 detects the box storage instruction, it receives the document as electronic data from the scanner section 104 via the scanner I/F 208, and stores the electronic data in the DRAM 202. The CPU 201 performs, for example, image format conversion that has been specified by a user on the image data stored in the DRAM 202. The CPU 201 transfers the image data that has been stored in the DRAM 202 to a storage destination that has been specified by a user, such as the flash ROM 210 located inside the MFP 100 and a memory medium (not illustrated) via the SATA I/F 205. In the fax function, the CPU 201 may convert a received image into a format that can be viewed on a PC and the like and store it in a box, instead of printing the received image.

Additionally, as a box function, the MFP 100 servers as a file server, for example, an SMB server, and the contents of a Flash ROM 211 are made public. In the box function, the CPU 201 detects a box access instruction from the outside via the network I/F 204. In the box access instruction, for example, an image file path of an access destination is included. The CPU 201 transfers image data that is stored in the Flash ROM 210 corresponding to the specified image file path to a requesting source of the box access instructions via the network I/F 204. Note that the above description is an example of a function of the MFP 100, and a function that is other than this may be used.

Figure 3:
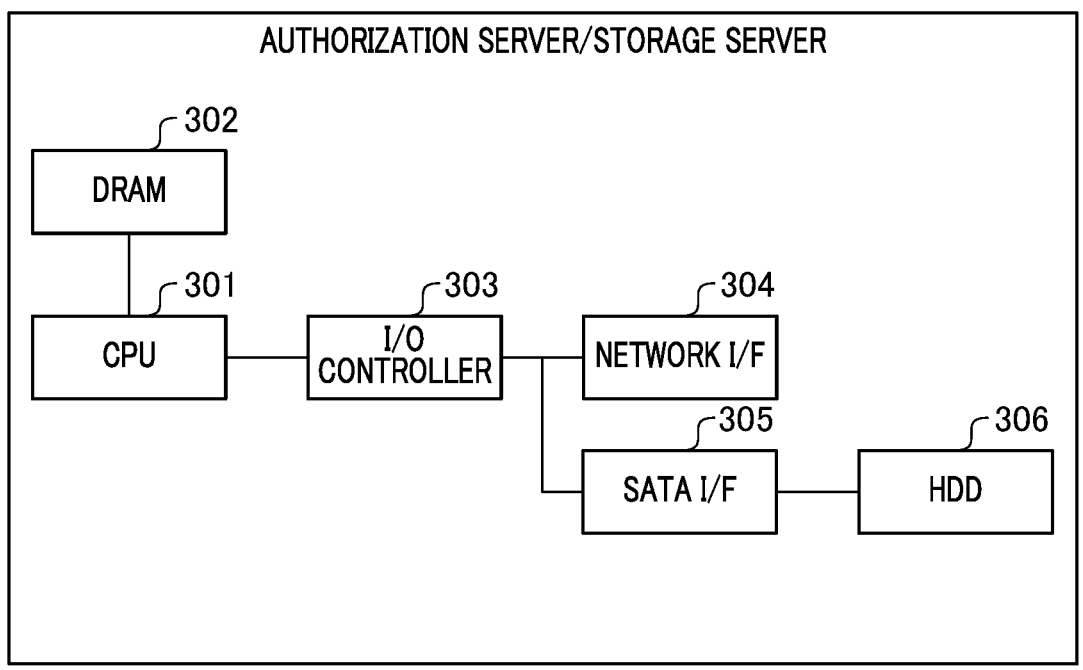
FIG. 3 is a block diagram showing the internal configuration of an authorization server/storage server.

FIG. 3 is a block diagram showing the internal configuration of the authorization server 110/storage server 120. Although, in the present embodiment, the authorization server 110 and storage server 120 are shown in the same block diagram to simplify the explanation, a different configuration may be used. A CPU 301 is connected to a DRAM 302 via a bus. The DRAM 302 is used by the CPU 301 to serve as a working memory for temporarily locating program data that indicates calculation instructions in the process of calculation performed by the CPU 301 and data to be processed. The CPU 301 is connected to an I/O controller 303 via a bus. A network I/F 304 is connected to the I/O controller 303. A wired LAN device and a wireless LAN device is connected to the network I/F 304. The CPU 301 realizes communication on the network 150 by controlling the wired LAN device and the wireless LAN device via the network I/F 304. The I/O controller 303 performs input/output to and from various devices according to the instruction of the CPU 301. The SATA I/F 305 is connected to the I/O controller 303, and an HDD 306 is connected to the SATA I/F 305. The CPU 301 uses the HDD 306 to permanently store, for example, programs, settings, and the like of the authorization application 111 if the server is an authorization server, and programs, settings, and the like of the storage application 121 if the server is a storage server. Thus, hardware such as the CPU 301, the DRAM 302, the HDD 306, and the like configure referred to as a computer. Although, in the present embodiment, for the sake of explanation, one CPU 301 uses one memory (DRAM 302) and executes each of the processes shown in the flowchart to be described below, other modes may be used. For example, a plurality of processors, a RAM, a ROM, and a storage may cooperate with each other to execute each of the processes shown in a flowchart to be described below. Additionally, a plurality of server computers can execute each of the processes.

Figure 4:
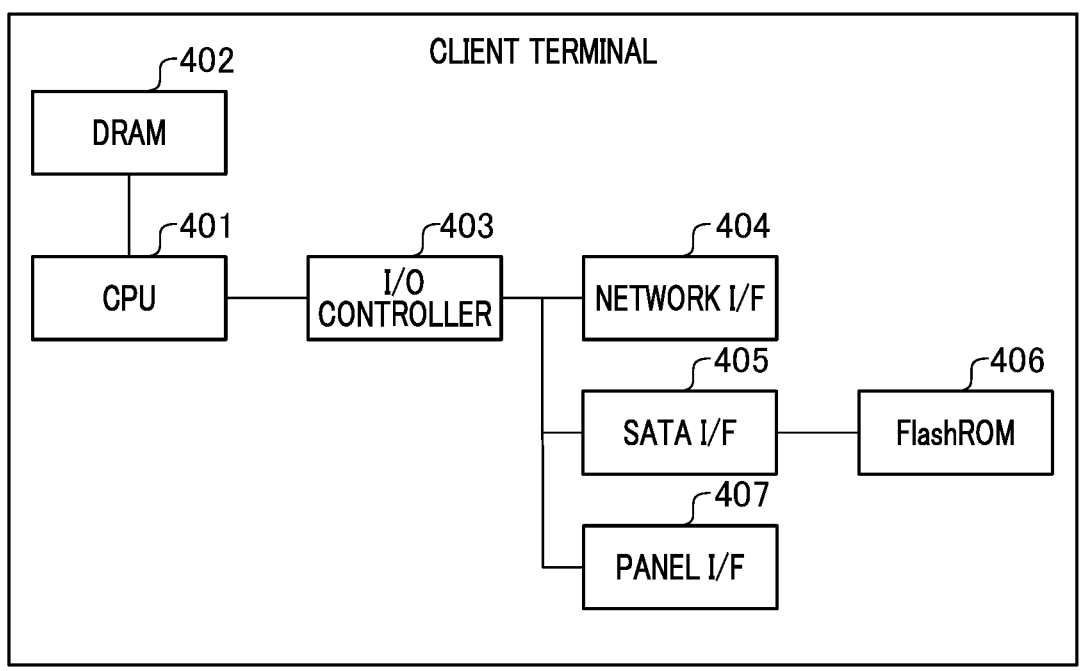
FIG. 4 is a block diagram showing the internal configuration of a client terminal.

FIG. 4 is a block diagram showing the internal configuration of the client terminal 130. A CPU 401 is connected to a DRAM 402 via a bus. The DRAM 402 is used by the CPU 401 to serve as a working memory for temporarily locating program data that indicates calculation instructions in the process of calculation performed by the CPU 401 and data to be processed. The CPU 401 is connected to an I/O controller 403 via a bus. A network I/F 404 is connected to the I/O controller 403. A wired LAN device, a wireless LAN device, or a data communication device is connected to the network I/F 404. The CPU 401 realizes communication on the network 150 by controlling the wired LAN device, the wireless LAN device, and a data communication device via the network I/F 404. The I/O controller 403 performs input/output to and from various devices according to the instruction of the CPU 401. A SATA I/F 405 is connected to the I/O controller 403, and a Flash ROM 406 is connected to the SATA I/F 405. Instead of the Flash ROM, a large capacity storage device such as an HDD may be connected. The CPU 401 uses the Flash ROM 406 to permanently store setting values set in the program of the reservation scan application 131 and the like. A panel I/F 407 is connected to the I/O controller 403, and the CPU 401 realizes input/output to and from the operation unit 102 of the client terminal 130 that is connected via the panel I/F 407 for the user. An example of the operation unit 102 is a touch panel. A display device, such as a display for display, and an input device, such as a keyboard for input, may be connected to the panel I/F 407.

Figure 5:
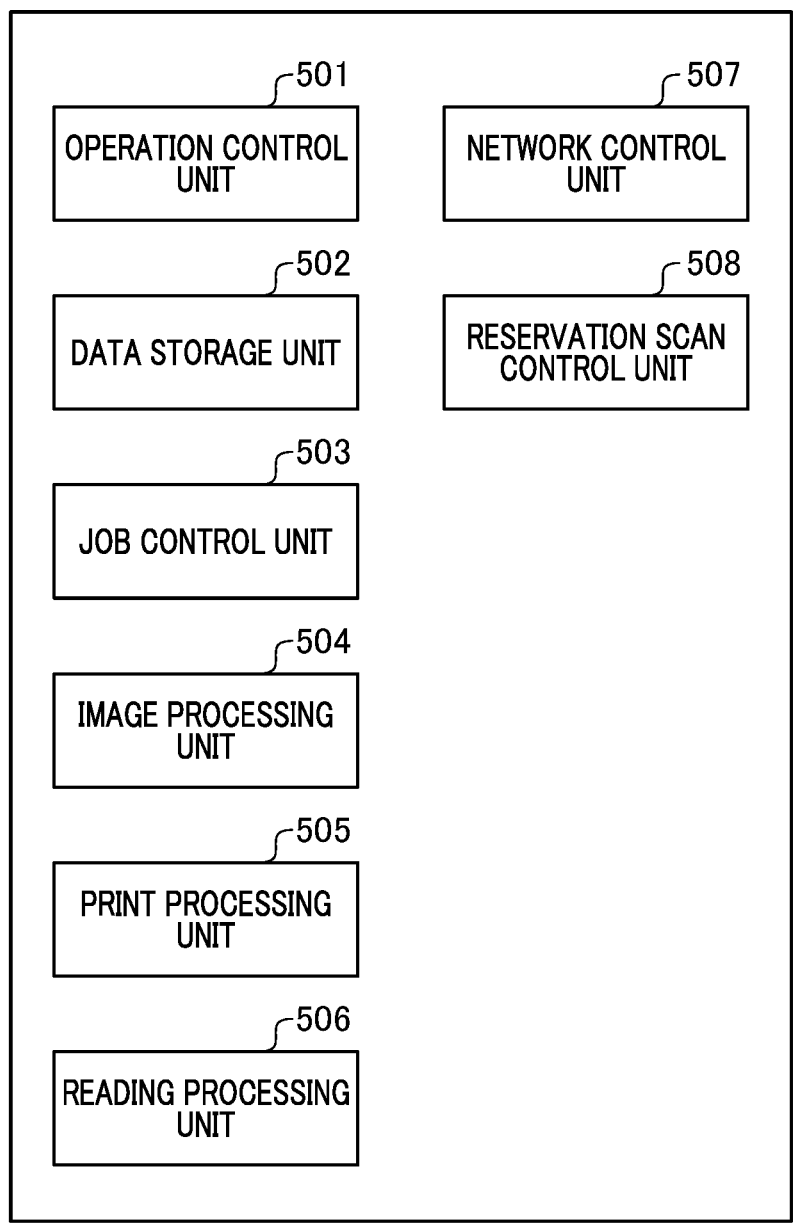
FIG. 5 is a block configuration diagram of software that is executed by the controller section of the MFP.

FIG. 5 is a block configuration diagram of software that is executed by the controller section 101 of the MFP 100. All software executed by the controller section 101 is executed after the CPU 201 reads the program stored in the Flash ROM 210 into the DRAM 202.

An operation control unit 501 executes display of a screen image for the user on the operation unit 102, executes detection of user operation, and executes processing that is linked to screen components such as a button that are displayed on the screen. A data storage unit 502 performs storage of requests from other control sections on the Flash ROM 210, and performs reading them. A job control unit 503 controls job execution according to instructions from other control units. An image processing unit 504 processes image data into a format that is suitable for the intended use, according to an instruction from the job control unit 503. A print processing unit 505 prints and outputs an image on a paper medium via the printer I/F 207, according to an instruction from the job control unit 503. A reading processing unit 506 reads the set document via the scanner I/F 208 according to the instruction from the job control unit 503. A network control unit 507 performs input/output of data from a LAN and public line network via the network I/F 204, according to the instructions from each of the control units. Additionally, the data storage unit 502 can access the data stored in the Flash ROM 210 from an external device via the network control unit 507. The examples of data that are stored in the Flash ROM 210 include images such as PDF and JPEG.

The reservation scan control unit 508 generates the reservation scan instruction of the client terminal 130 that has been received from the network control unit 507 as an reservation scan job. Additionally, the reservation scan control unit 508 displays the reservation scan job on the operation control unit 501, and executes the reservation scan job. Additionally, the reservation scan control unit 508 transmits image data and the like that has been read by the reading processing unit 506 to the storage server 120 via the network control unit 507.

Note that the reservation scan is a processing that includes the scanning and transmission of a job ticket related to the scanning and transmission that is reserved in the MFP in advance as a job and is executed by the user operation of the user who has logged in. The job ticket includes scan settings, a transmission destination (storage destination), and a token. The location in which job tickets are stored in advance (reserved or accumulated) is the nonvolatile storage region of the MFP. Additionally, a reservation scan job is a job in which a job ticket containing a scan setting, a transmission destination (storage destination), and a token is stored in an MFP as a job, and the job is specified by a user operation and instructed to execute.

Figure 6:
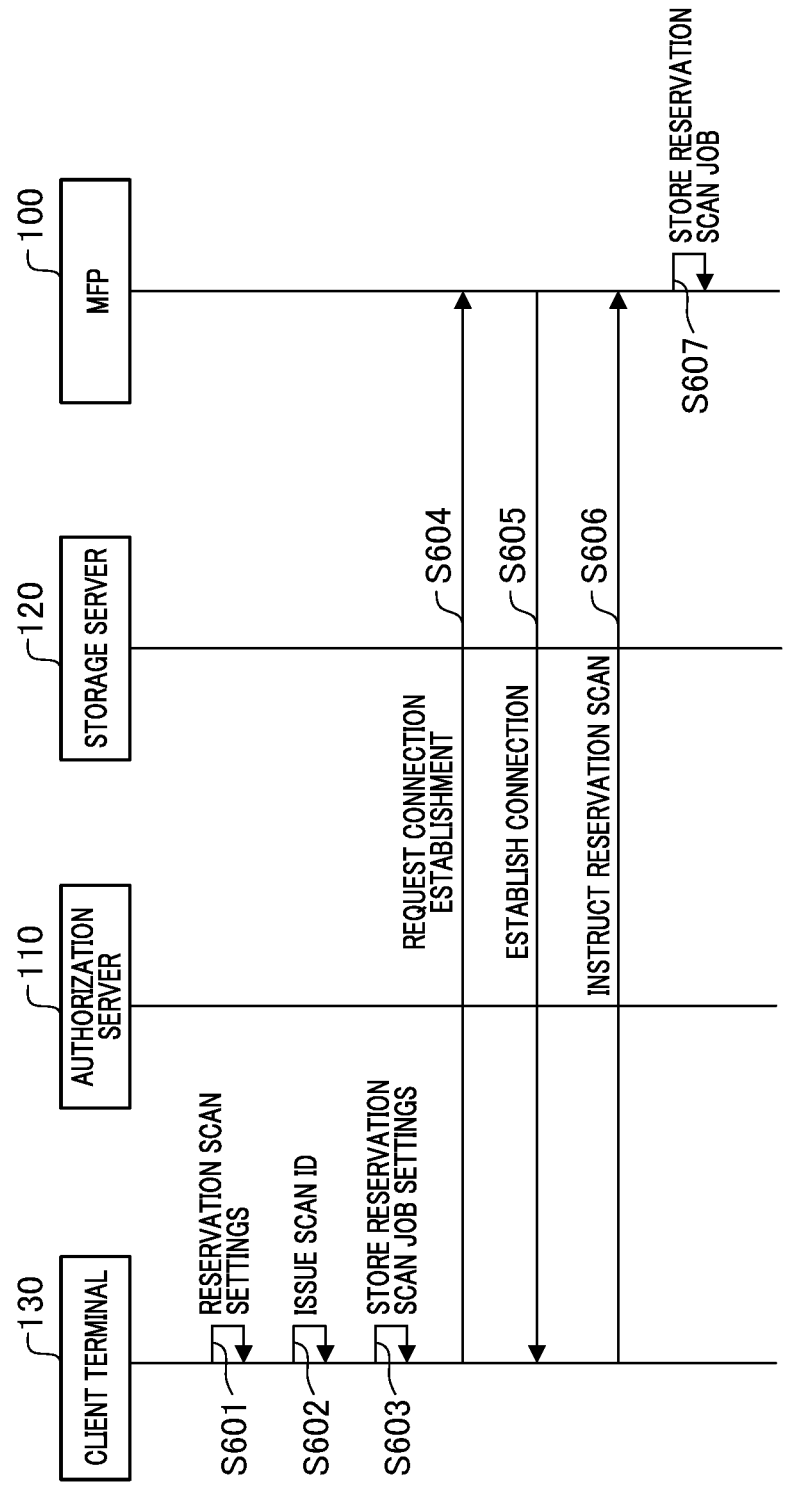
FIG. 6 is a sequence diagram showing a reservation scan job issuance instruction from the client terminal to the MFP.

An overview of the operation in the present embodiment will be explained with reference to FIG. 6 to FIG. 20. FIG. 6 is a sequence diagram showing that an instruction for issuing a reservation scan job is performed from the client terminal 130 to the MFP 100. Specifically, FIG. 6 shows that the reservation scan application 131 on the client terminal 130 performs scan settings and setting of a storage destination of the storage server 120, and instructs the MFP 100 to issue a reservation scan job.

In the present embodiment, all software executed in the MFP 100 in FIG. 6 is executed after the CPU 201 reads the program that is stored in the Flash ROM 210 into the DRAM 202. All the software executed on the client terminal 130 in FIG. 6 is executed after the CPU 401 reads the program that is stored in the Flash ROM 406 into the DRAM 402. This flow starts when a user starts setting of a reservation scan on the client terminal 130. In the sequence below, the explanation regarding an operation in the case of an error that is not essential to the present embodiment will be omitted.

In S601, the reservation scan application 131 on the client terminal 130 displays the reservation scan setting screen as shown in FIG. 8, and waits for user input. FIG. 8 is a diagram showing an example of a reservation scan setting screen displayed on the reservation scan application 131 on the client terminal 130. In the scan settings 801, read document size setting such as A3, A4, and the like, color setting such as full color, grayscale, and the like, and file type setting of image files to be stored as JPEG, PDF, and the like are displayed. Additionally, the path to storage destination 802 in the storage server 120 and the setting of name 803 of the reservation scan job are displayed. A button 804 is a button for selecting a path to a storage destination of the storage server 120. When the button 804 is pressed down, the reservation scan application 131 acquires an access token and selects a path to a storage destination on a directory list screen in the storage server 120 (not illustrated). The sequence for obtaining an access token and obtaining the directory list will be described below in FIGS. 7A and 7B. Note that the setting shown in FIG. 8 is an example, and if the present embodiment can be realized, other settings are possible, or a part of settings may be used. For example, scan settings other than these may be set, and the name of the reservation scan job need not be set. Note that, in the present embodiment, it is assumed that the storage server 120 that is the storage destination and the MFP 100 that is the transmission destination of the reservation scan job have already been specified in advance by the client terminal 130. It is needless to say that the storage server 120 and the MFP 100 may be selected in FIG. 8 without being specified by the client 130 in advance.

In S602, the reservation scan application 131 of the client terminal 130 issues a scan ID. A scan ID is displayed on the client terminal 130 (not illustrated). By inputting the displayed scan ID when a reservation scan job is executed in the MFP 100, it is confirmed whether or not a person is a rightful person who executes the reservation scan job. Execution of the reservation scan job in the MFP 100 will be described below with reference to FIG. 11.

In S603, the reservation scan application 131 on the client terminal 130 stores the reservation scan job settings in the client terminal 130. FIG. 9 is a diagram showing an example of a reservation scan job setting. In the example as shown in FIG. 9, scan setting 901, storage destination 902, and name 903, access token 904, and scan ID 905 are stored. The scan setting 901, the storage destination 902, the name 903 are setting values that have been specified by the user in FIG. 8. The access token 904 is an access token obtained in FIG. 7B to be described below, and the scan ID 905 is issued in S602.

In S604, the reservation scan application 131 on the client terminal 130 transmits a request for establishing a connection to the MFP 100. Thereby, it is possible to transmit the result of storage on the storage server 120 from the MFP 100 to the client terminal 130. For example, the WebSocket mechanism specified in RFC 6455 is used as a communication protocol.

In S605, the network control unit 507 of the MFP 100 processes a request for establishing a connection in S604. Thereby, a connection for performing notification from the MFP 100 to the client terminal 130 is established.

In S606, the reservation scan application 131 on the client terminal 130 transmits an instruction for the reservation scan to the MFP 100. The contents of the reservation scan are the reservation scan job setting shown in FIG. 9. Note that, for the request from the client terminals 130 to the MFP 100, a storage instruction may be performed to the storage server 120 using a general-purpose mechanism that is defined by REST API or the like. Here, REST is an abbreviation for "REpresentation State Transfer". Alternatively, the connection between the MFP 100 and the client terminal 130 established in S604 and S605 may be used.

In S607, the reservation scan control unit 508 of the MFP 100 stores the contents of the reservation scan job that has been received from the reservation scan application 131 on the client terminal 130, inside the MFP 100. The contents of the reservation scan job stored in the MFP 100 are the same as those in FIG. 9 described above. Thus, the reservation scan control unit 508 functions as a storage unit that stores data including a transmission destination to which an image generated by a scanner is to be transmitted and a token used for storing the image in the transmission destination.

FIGS. 7A and 7B are a sequence diagram in which the client terminal 130 sets a storage destination of the storage server 120. Specifically, FIG. 7 is a sequence diagram in which the reservation scan application 131 on the client terminal 130 acquires an access token for access to the storage server 120, and sets the storage destination of the reservation scan. In the present embodiment, all the software executed on the client terminal 130 in FIG. 7 is executed after the CPU 401 reads the program that has been stored in the Flash ROM 406 into the DRAM 402. All the software executed by the authorization server 110 in FIG. 7 is executed after the CPU 301 reads the program that has been stored in the HDD 306 into the DRAM 302. When the client terminal 130 starts setting a storage destination of the storage server 120, this flow starts.

In S701, the reservation scan application 131 on the client terminal 130 transmits, to the authorization server 110, an authorization request in response to the storage access by the storage server 120.

In S702, the authorization application 111 of the authorization server 110 instructs the reservation scan application 131 on the client terminal 130 to display an authorization screen. Although this matter is not explained because it is not the essence of the present invention, it is assumed that the reservation scan application 131 on the client terminal 130 has already applied the authority to access the storage server 120.

In S703, the reservation scan application 131 on the client terminal 130 displays an authorization screen. FIG. 10 is a diagram showing an example of an authorization screen. In FIG. 10, display 1001 that indicates authority for the storage server 120 and input fields for a username 1002 and a password 1003 are present. When a user permits access to the storage server 120, the user inputs the username 1002 and the password 1003 to permit access. Note that the screen in FIG. 10 is an example, and if the present embodiment can be realized, information other than this may be displayed. Additionally, when access is not permitted is selected, re-authentication, error processing, and the like are performed. However, since this is not the essence of the present embodiment, the explanation will be omitted.

In S704, the reservation scan application 131 on the client terminal 130 transmits the username and password that have been input in S703, which are used as authentication information, to the authorization server 110.

In S705, the authorization application 111 of the authorization server 110 confirms whether or not authentication information transmitted from the client terminal 130 in S704 is valid by using, for example, authentication information DB (not illustrated). For example, a combination of the username and the password is stored in the authentication information DB, and it is confirmed whether or not it matches the transmitted authentication information.

In S706, the authorization application 111 of the authorization server 110 issues an authorization code when the authentication information that has been transmitted from the client terminal 130 in S705 is valid.

In S707, the authorization application 111 of the authorization server 110 transmits the authorization code issued in S706 to the client terminal 130.

In S708, the reservation scan application 131 on the client terminal 130 transmits the authorization code acquired in S707 to the authorization server 110, and requests issuance of an access token.

In S709, the authorization application 111 of the authorization server 110 confirms whether or not the authorization code that has been passed from the client terminal 130 in S709 is valid.

In S710, the authorization application 111 of the authorization server 110 issues an access token and a refresh token when the authorization code transmitted from the client terminal 130 is valid.

In S711, the authorization application 111 of the authorization server 110 transmits the access token and the refresh token issued in S710 to the client terminal 130.

In S712, the reservation scan application 131 on the client terminal 130 passes the access token received in S711 to the storage server 120, and requests acquisition of lists of directory and file.

In S713, the storage app 121 of the storage server 120 confirms to the authorization server 110 whether or not the access token received from the client terminal 130 is valid.

In S714, the authorization application 111 of the authorization server 110 confirms the validity of the access token received from the storage server 120 in S713.

In S715, the authorization application 111 of the authorization server 110 returns a confirmation result of the access token to the storage server 120.

In S716, the storage application 121 of the storage server 120 confirms the confirmation result of the access token returned from the authorization server 110.

Hereinafter, in this sequence, only cases in which the access token is valid are explained, and explanations for the case in which the access token is invalid will be omitted. For example, when the access token is invalid, error processing is performed (not illustrated).

Since the access token is valid, in S717, the storage application 121 of the storage server 120 returns the list of files and directories in the storage server 120 to the client terminal 130.

In S718, the reservation scan application 131 of the client terminal 130 displays the list of directories in the storage server 120 (not illustrated), and the user who operates the client terminal 130 selects a storage destination.

In the present embodiment, in S717, an example in which the list of files and directories in the storage server 120 is returned only once is shown. Instead, in order for the user to move within the hierarchy of directories, the file and directory list within the directory to which the user has moved may be returned and exchanged between the client terminal 130 and the storage server 120 a plurality of times. Note that, although, in the explanation in FIG. 7, an example of using an authorization code is shown, an example of issuing an access token by other methods may, of course, be used. To simplify the explanation, in this sequence, the description of confirmation of whether or not the authorization code or the access token has expired is omitted, and the acquisition of the authorization code or the access token is not required every time. It is sufficient if the authorization application 111 confirms whether or not the authorization code or the access token has expired, and the reservation scanning application 131 acquires the authorization code or the access token only when the expiration date has expired.

Figure 11:
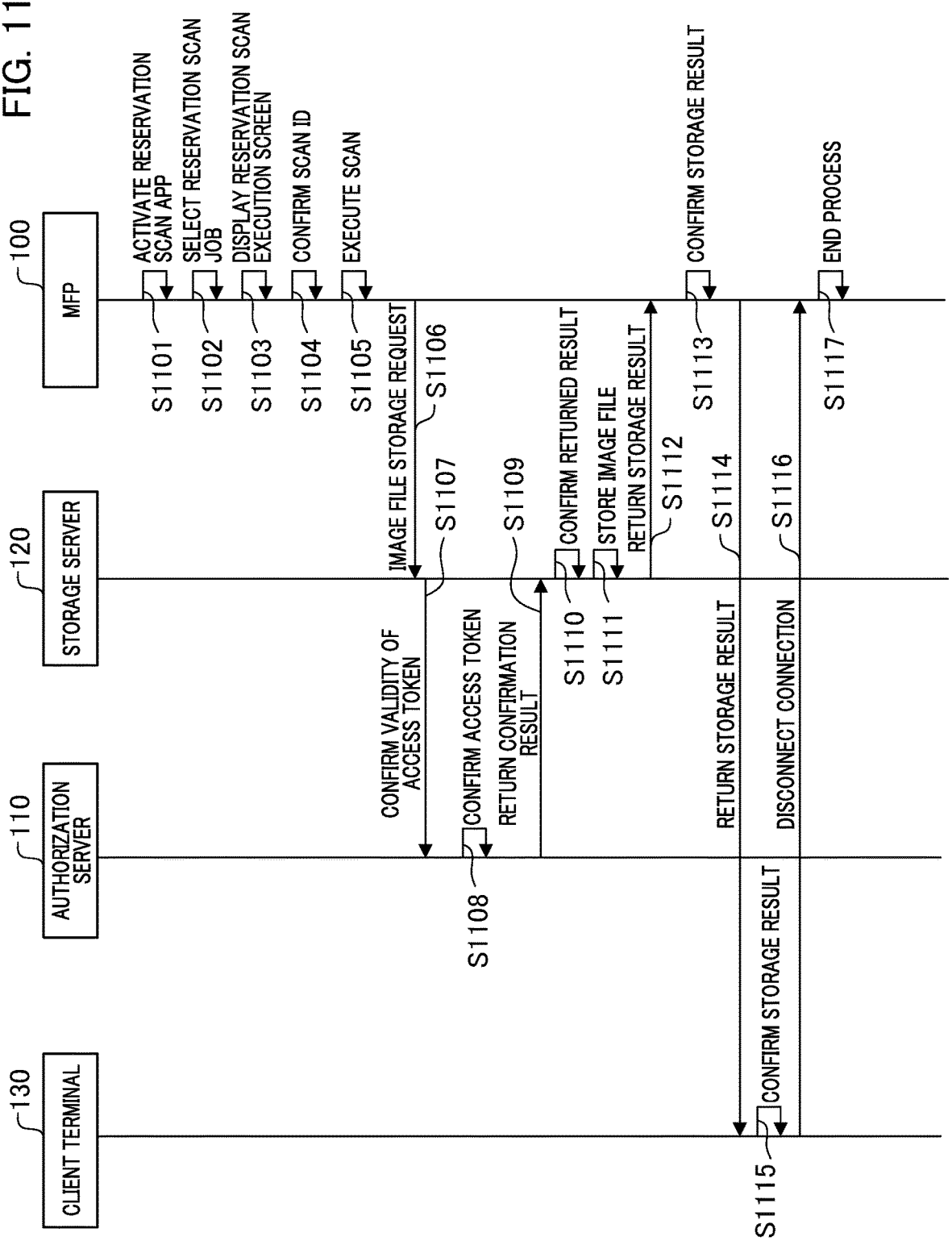
FIG. 11 is a sequence diagram of an example in which a reservation scan is executed on the MFP, and a scanned file is successfully stored on a storage server.

FIG. 11 is a sequence diagram of an example in which a reservation scan is executed in the MFP 100, and the scanned file is successfully stored on the storage server 120. In the present embodiment, all the software executed in the MFP 100 in FIG. 11 is executed after the CPU 201 reads the program that has been stored in the Flash ROM 210 into the DRAM 202. All the software executed in the client terminal 130 in FIG. 11 is executed after the CPU 401 reads the program that is stored in the Flash ROM 406 into the DRAM 402. All the software executed by the authorization server 110 and storage server 120 in FIG. 11 is executed after the CPU 301 reads the program that is stored in the HDD 306 into the DRAM 302. When the reservation scan processing starts in the MFP 100, this flow starts.

In S1101, according to an instruction from a user who operates the MFP 100, the reservation scan control unit 508 of the MFP 100 starts the reservation scan application.

Figure 12:
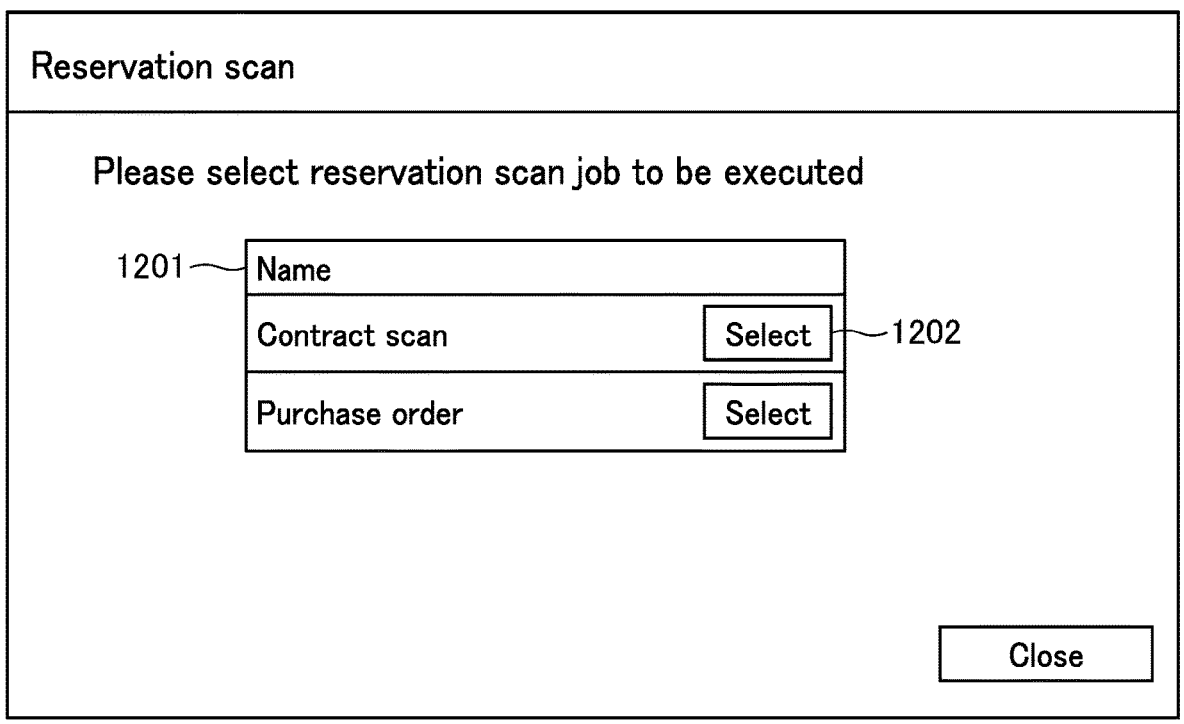
FIG. 12 is a drawing showing an example of a reservation scan job selection screen.
Figure 13:
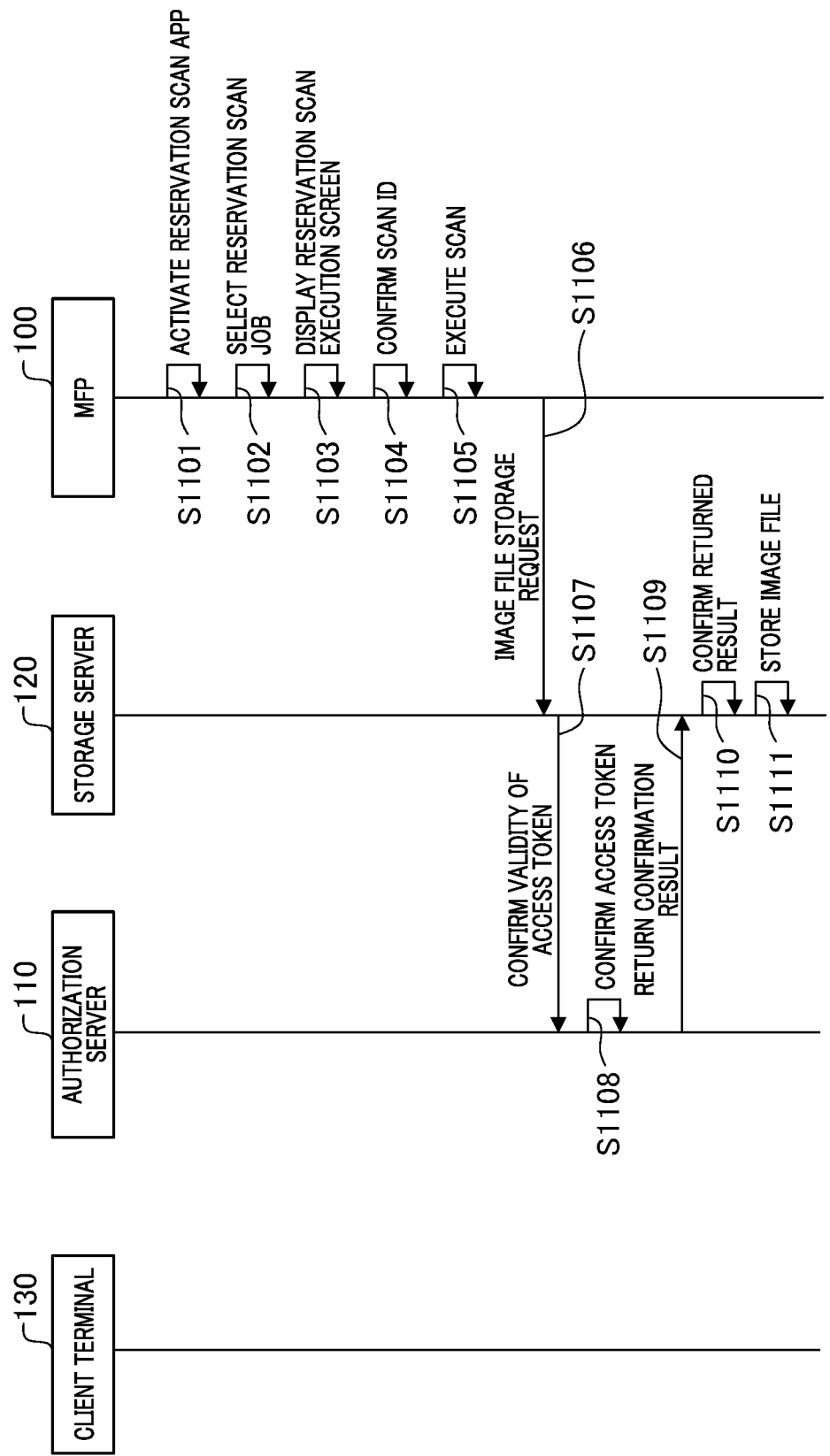
FIG. 13 is a diagram showing an example of a reservation scan execution screen.

In S1102, the reservation scan control unit 508 of the MFP 100 displays a reservation scan job selection screen (FIG. 12) on the operation unit 102. FIG. 12 is a drawing showing an example of a reservation scan job selection screen. A list of reservation scan jobs stored in the MFP 100 is displayed on the reservation scan job selection screen. In FIG. 12, a name 1201 is the name of the reservation scan job. A selection button 1202 is a button for selecting which reservation scan job is to be executed. When a reservation scan job is selected by the selection button 1202, the scan execution screen shown in FIG. 13 is displayed. Note that, although, in FIG. 12, only the name 1201 is displayed, of course, other information such as scan setting and the date and time when the reservation scan job is specified may be displayed.

In S1103, the reservation scan control unit 508 of the MFP 100 displays a reservation scan execution screen (FIG. 13) on the operation unit 102. FIG. 13 is a diagram showing an example of a reservation scan execution screen. A name 1301 is the name of the selected reservation scan job. Scan setting 1302 is the scan setting of the selected reservation scan job, and the storage destination 1303 is the storage destination for the selected reservation scan job on the storage server 120. These items of information are the reservation scan job settings in FIG. 9 that have been stored in the MFP 100 in S607. In the case in which the scan setting is changed, when a setting change button 1304 is pressed by the user, a scan setting change screen (not illustrated) is displayed, and the setting can be changed to a setting that is different from the scan setting that has been set by the client terminal 130. A field 1305 is a scan ID input field. In S602, by inputting the scan ID of the reservation scan job issued when the user performs the setting on the client terminal 130, it is confirmed whether or not the reservation scan job is executed by a rightful user. A button 1306 is a scan button, and when the scan button is pressed down, a scan is executed, and storage processing is performed to the specified storage destination of the storage server 120. A button 1307 is a return button, and when the return button is pressed down, the screen returns to the reservation scan selection screen as shown in FIG. 12. Note that, although, in the present embodiment, an example in which authentication is not performed in the MFP 100 is shown, a mode in which authentication is performed in the MFP 100 may be adopted. Alternatively, a mode may be adopted in which the client terminal 130 specifies a user of the MFP 100 and generates a reservation scan job, and the reservation scan control unit 508 displays only the reservation scan job of a user who has logged in to the MFP 100 and been authenticated.

In S1104, the reservation scan control unit 508 of the MFP 100 confirms whether or not the scan ID that has been input on the reservation scan execution screen in FIG. 13 matches the scan ID of the selected reservation scan job. Confirmation processing is performed by comparing to FIG. 9 stored in MFP 100. In this sequence, the case in which scan IDs match will be explained.

In S1105, since the scan IDs match, the reservation scan control unit 508 of the MFP 100 executes the scan processing with the specified scan settings to generate an image file. The generated image file is stored in a temporary region of the image storage 106 of the MFP 100. When a reservation scan job is executed, a reservation scan job ID that uniquely identifies the executed reservation scan job is issued (not illustrated). As will be described below, the reservation scan job ID is used for identifying the reservation scan job in which an error occurs when the error occurs. In this sequence, an explanation of the case in which the scan IDs do not match is omitted, and, for example, if the scan IDs do not match, the reservation scan control unit 508 may display an error screen and may prompt for input again (not illustrated).

In S1106, the reservation scan control unit 508 of the MFP 100 requests the storage server 120 to store the image file. This request includes the access token and the storage destination of the storage server 120 corresponding to the reservation scan job (setting of the reservation scan job in FIG. 9 stored in the MFP 100), in addition to the scanned image file. Thus, the reservation scan control unit 508 functions as a transmission unit that attempts to transmit an image that has been generated by a scanner to a transmission destination included in data using a token, according to a user instruction.

In S1107, the storage application 121 of the storage server 120 confirms with the authorization server 110 whether or not the access token received from the MFP 100 is valid.

In S1108, the authorization application 111 of the authorization server 110 confirms whether or not the access token that has been transmitted from the storage server 120 is valid. In this sequence, the case in which access token is valid is explained.

In S1109, the authorization application 111 of the authorization server 110 transmits a confirmation result of the access token to the storage server 120.

In S1110, the storage application 121 of the storage server 120 confirms the confirmation result of the access token that has been received from the authorization server 110. In this sequence, the explanation of the case in which the access token is not valid is omitted, and, for example, if the access token is not valid, an error screen (not illustrated) is displayed.

Since, in S1111, the access token is valid, the storage application 121 of the storage server 120 stores the image file in the storage destination that has been specified in S1106.

In S1112, the storage application 121 of the storage server 120 returns the storage result of the image file to the MFP 100. In this sequence, a case in which the image file has been saved successfully is explained.

In S1113, the reservation scan control unit 508 of the MFP 100 confirms the storage result that has been returned from the storage server 120. The case in which image file storage fails will be explained in the sequence in FIG. 14 and FIG. 15 to be described below.

In S1114, the reservation scan control unit 508 of the MFP 100 provides the notification about the result (success) to the client terminal 130.

In S1115, the reservation scan application 131 of the client terminal 130 confirms the result that has been returned from the MFP 100.

Since, in S1116, the image file has been stored successfully, the reservation scan application 131 on the client terminal 130 disconnects the connection established in S605.

In S1117, the reservation scan control unit 508 of the MFP 100 performs end processing. In the end processing, the image files stored in the temporary region of the image storage 106 are deleted and the reservation scan job is deleted.

Figure 14:
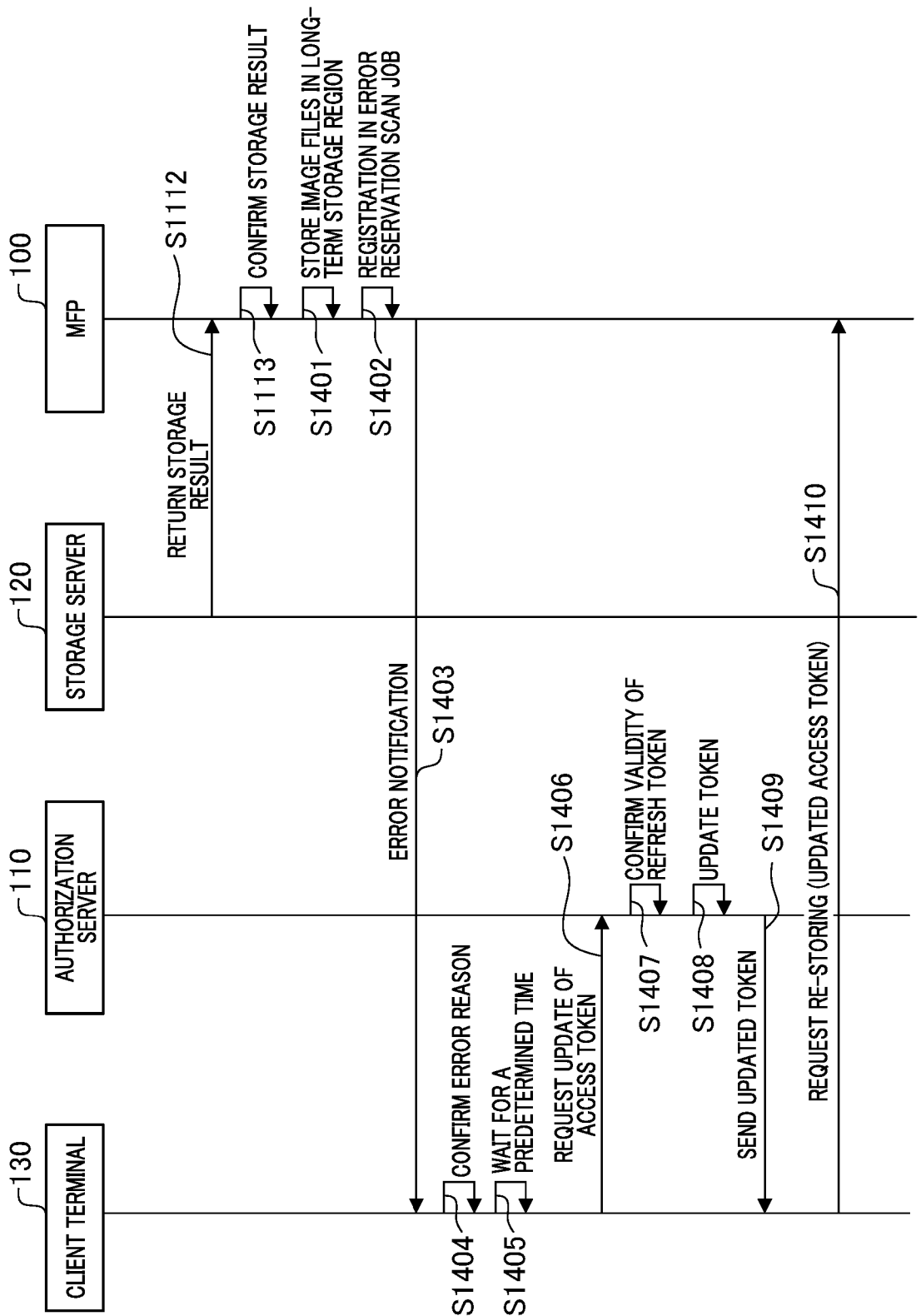
FIGS. 14A and 14B are sequence diagrams of an example in which a reservation scan is executed in the MFP, and storage of the scanned file on the storage server fails (short time to recover from error).
Figure 15:
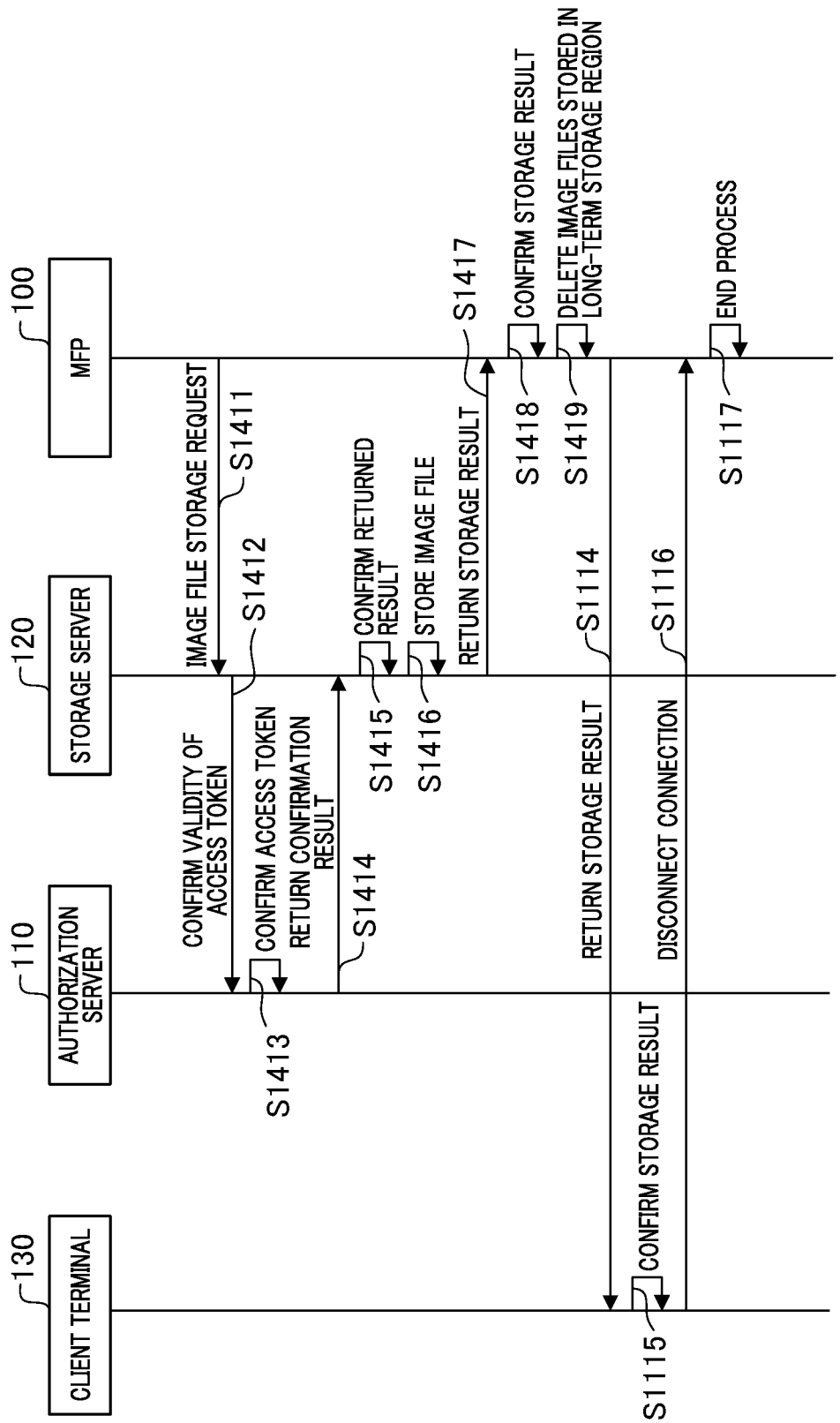
FIG. 15 is a sequence diagram of an example in which a reservation scan is executed in the MFP, and storage of the scanned file on the storage server fails (short time to recover from error).

FIG. 14 and FIG. 15 are sequence diagrams of an example in which reservation scanning is executed in the MFP 100 and storage of the scanned file on storage server 120 fails (short time to recover from an error). Specifically, this is an example of the case in which image file storage on the storage server 120 fails, and it is determined that it will take a short time to recover from an error. The processes from S1101 to S1113 in which the stored result returned from the storage server 120 is confirmed, and the processes followed by S1114 in which the result to the client terminal 130 in FIG. 11 is returned are the same as those in FIG. 14 and FIG. 15. Hence, the same reference numerals are provided, and the explanation will be omitted. In the present embodiment, all the software executed in the MFP 100 shown in FIG. 14 and FIG. 15 is executed after the CPU 201 reads the program that is stored in the Flash ROM 210 into the DRAM 202. All the software executed by the client terminal 130 in FIG. 14 and FIG. is executed after the CPU 401 reads the program that is stored in the Flash ROM 406 into the DRAM 402. All the software executed by the authorization server 110 and the storage server 120 in FIG. 14 and FIG. 15 is executed after the CPU 301 reads the program that is stored in the HDD 306 into the DRAM 302. This flow starts when the MFP 100 starts reservation scan processing.

Since, in S1401, storage of the image file on the storage server 120 has failed, the reservation scan control unit 508 of the MFP 100 stores the image file in the long-term storage region of the image storage 106 in the MFP 100. This is for retransmitting the scanned image file. The scanned image file that is stored in the temporary region of the image storage 106 is deleted. Hence, when the transmission of the image file to the transmission destination fails, the reservation scan control unit 508 manages the image that has been generated by the scanner while storing it for retransmission. Note that the storage destination may not necessarily be the long-term storage region of the image storage 106, and may be a storage destination other than the MFP 100.

In S1402, the reservation scan control unit 508 of the MFP 100 registers the storage destination in the list of error reservation scan jobs. FIG. 16 is a drawing showing an example of a list of error reservation scan jobs. A reservation scan job ID 1501 is the reservation scan job ID of the reservation scan job issued in S1105. A transmission destination 1502 is a storage destination and includes information on the storage server 120 and a path to the storage destination, which is used during retransmission. An image file 1503 is the storage destination of the image file of the error reservation scan job, and the storage destination stored in S1401 is set. Thus, the error notification includes identification information that identifies data including the token that is stored in the image processing apparatus, which is used as information that causes authentication for re-acquisition of the token. The reservation scan job ID 1501 in the present embodiment is an example of the identification information.

In S1403, the reservation scan control unit 508 of the MFP 100 provides an error notification to the client terminal 130 through the connection established in S605. Thus, the reservation scan control unit 508 functions as a notification unit that executes an error notification including information that causes authentication for reacquisition of a token if transmission of an image file to a transmission destination fails.

The error notification includes an error reason and a reservation scan job ID. More specifically, the error notification includes information on whether or not the image generated by the scanner can be transmitted to the transmission destination. Furthermore, when the image generated by the scanner can be transmitted to the destination, the error notification includes information on the time required until the transmission becomes possible.

In S1404, the reservation scan application 131 on the client terminal 130 confirms the error notification that has been transmitted from the MFP 100. In this sequence, it is determined that the error will be eliminated in a short time-period due to the reason of the error. For example, this is the case when conflict occurs in simultaneous access.

In S1405, the reservation scan application 131 on the client terminal 130 waits for a certain predetermined time according to the error reason. In this sequence, since the error is eliminated in a short time-period, the reservation scan application 131 on the client terminal 130 waits for a time that is necessary to eliminate the error.

In S1406, the reservation scan application 131 on the client terminal 130 passes the refresh token that has been acquired in S711 to the authorization server 110 to request updating of the access token.

In S1407, the authorization application 111 of the authorization server 110 confirms whether or not the refresh token received from the client terminal 130 is valid. In this sequence, only the case in which the refresh token is valid is explained, and, for example, if the refresh token is not valid, an error screen (not illustrated) is displayed.

In S1408, the authorization application 111 of the authorization server 110 updates the access token and refresh token.

In S1409, the authorization application 111 of the authorization server 110 transmits the access token and refresh token updated in S1408 to the client terminal 130.

In S1410, the reservation scan application 131 on the client terminal 130 transmits a request for restoring the image file to the MFP 100. The request is performed including the access token received from the authorization server 110 in S1409 and the reservation scan job ID transmitted from the MFP 100 in S1403. Thus, the reservation scan control unit 508 of the MFP 100 functions as a receiving unit that receives a token that has been reacquired according to authentication according to the error notification from client terminal 130.

In S1411, the reservation scan control unit 508 of the MFP 100 transmits, to the storage server 120, a retransmission request with the updated access token together with the path to the storage destination and the file to be stored. That is, this retransmission request is a request for restoring the image file. The storage server 120 is the transmission destination corresponding to the reservation scan job ID that has been sent from the client terminal 130. Thus, the reservation scan control unit 508 has a function of attempting to send an image generated by the scanner to the destination included in the data, using the reacquired token. Here, when transmission using the reacquired token is tried, the reservation scan control unit 508 performs transmission using the image stored for retransmission in S1401.

In S1412, the storage application 121 of the storage server 120 requests the authorization server 110 to confirm the validity of the updated access token received from the MFP 100.

In S1413, the authorization application 111 of the authorization server 110 confirms whether or not the access token received from the storage server 120 in S1412 is valid. In this sequence, only the case in which the access token is valid is explained.

In S1414, the authorization application 111 of the authorization server 110 returns the result confirmed in S1413 to the storage server 120.

In S1415, the storage application 121 of the storage server 120 confirms the result that has been confirmed by the authorization server 110. For example, if the access token is not valid, an error screen (not illustrated) is displayed.

Since, in S1416, the result that has been confirmed is valid, the storage application 121 of the storage server 120 stores the image file that has been passed from the MFP 100 in S1411.

In S1417, the result in which the image file is stored in the storage application 121 of the storage server 120 is transmitted to the MFP 100. In this sequence, the case in which the image file has been stored successfully is explained.

In S1418, the reservation scan control unit 508 of the MFP 100 confirms the storage result of the image file that has been transmitted from the storage server 120.

Since, in S1419, the image file has been stored successfully, the reservation scan control unit 508 of the MFP 100 deletes the image file that has been stored in the long-term storage region of the image storage 106 in S1401. Further, the reservation scan control unit 508 of the MFP 100 deletes the reservation scan job from the error reservation scan job list.

Figure 17A:
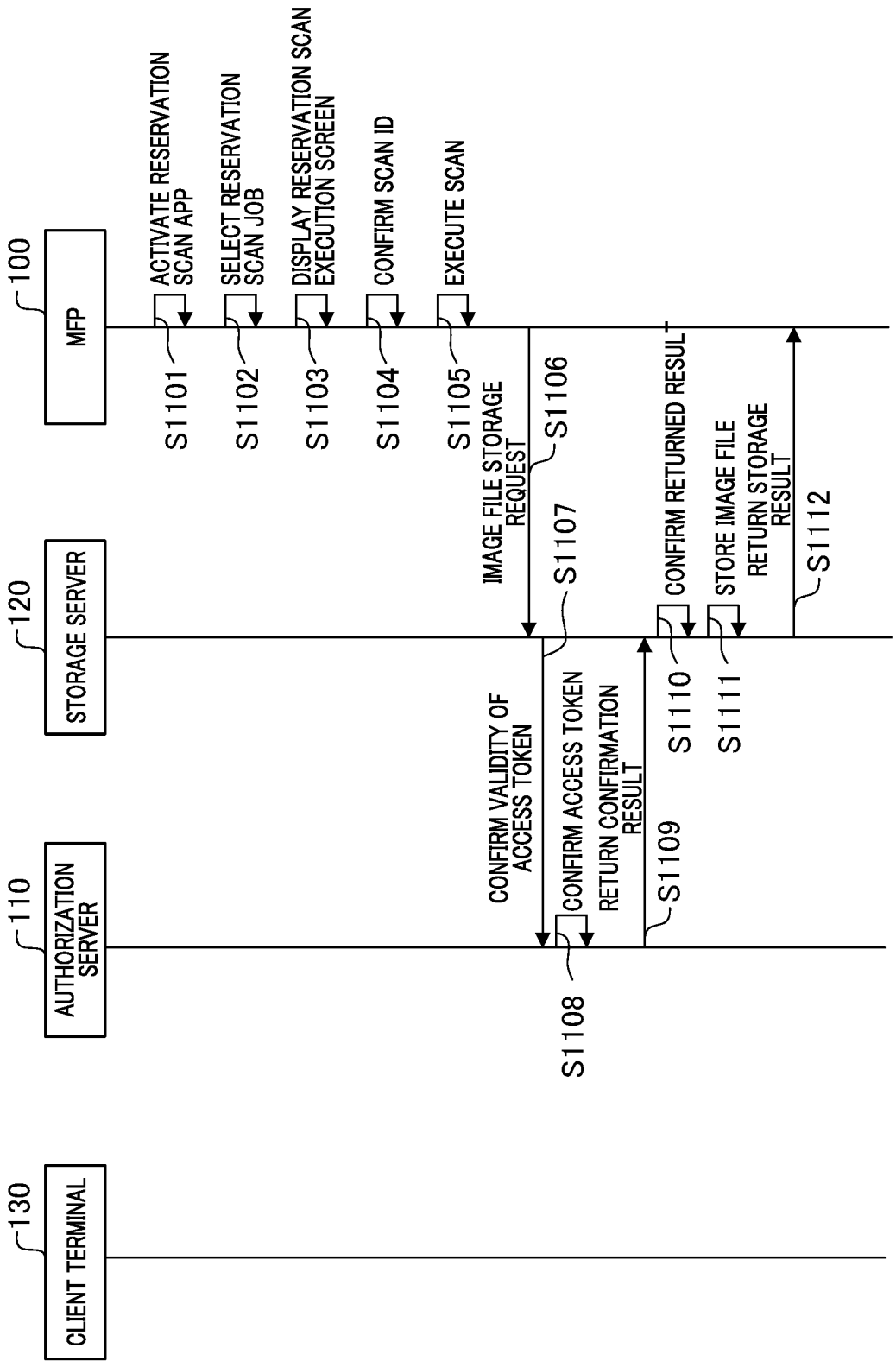
FIGS. 17A and 17B are sequence diagrams of an example in which a reservation scan is executed in the MFP, and storage of the scanned file on the storage server fails (long time to recover from error).
Figure 17B:
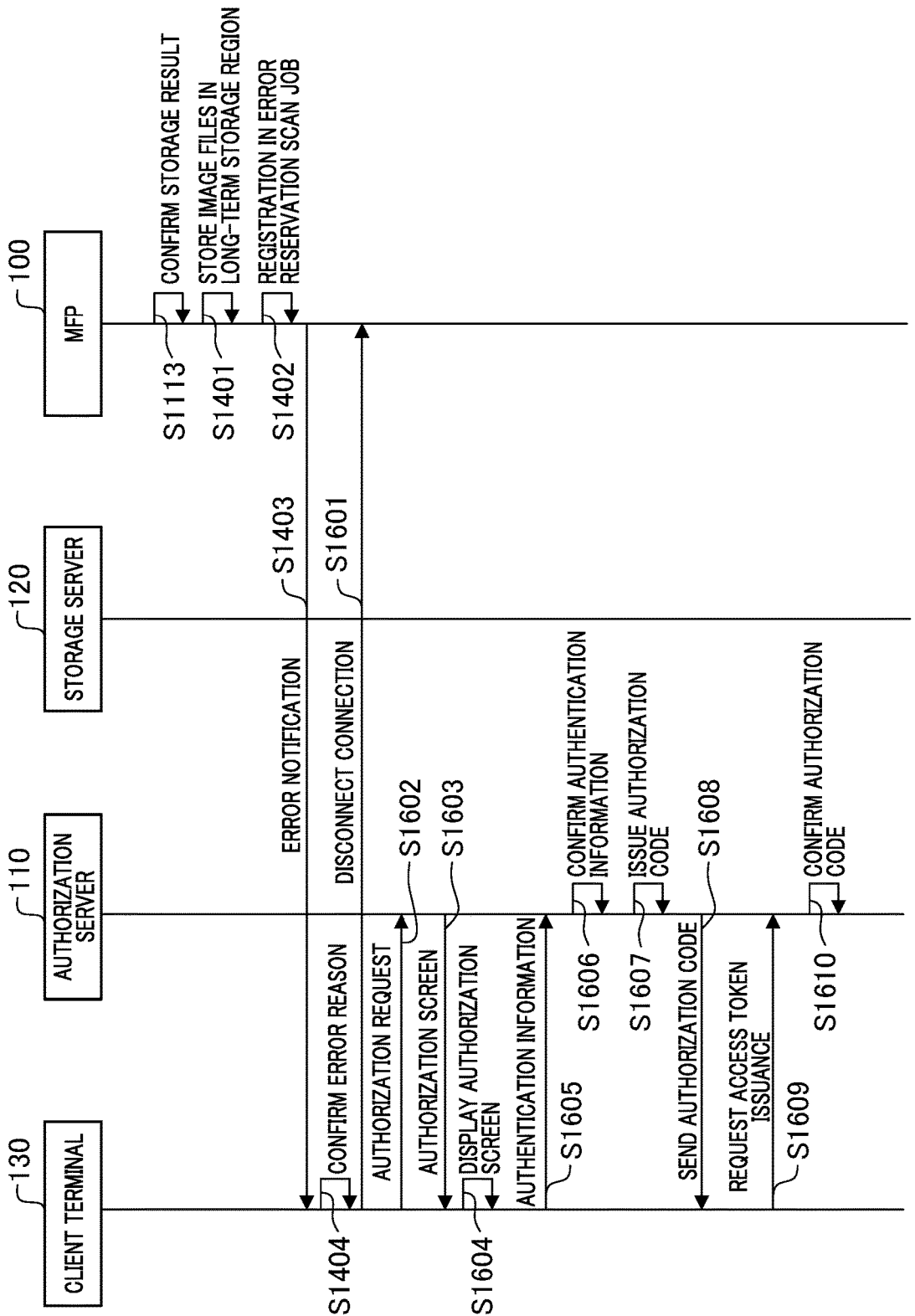
Figure 18:
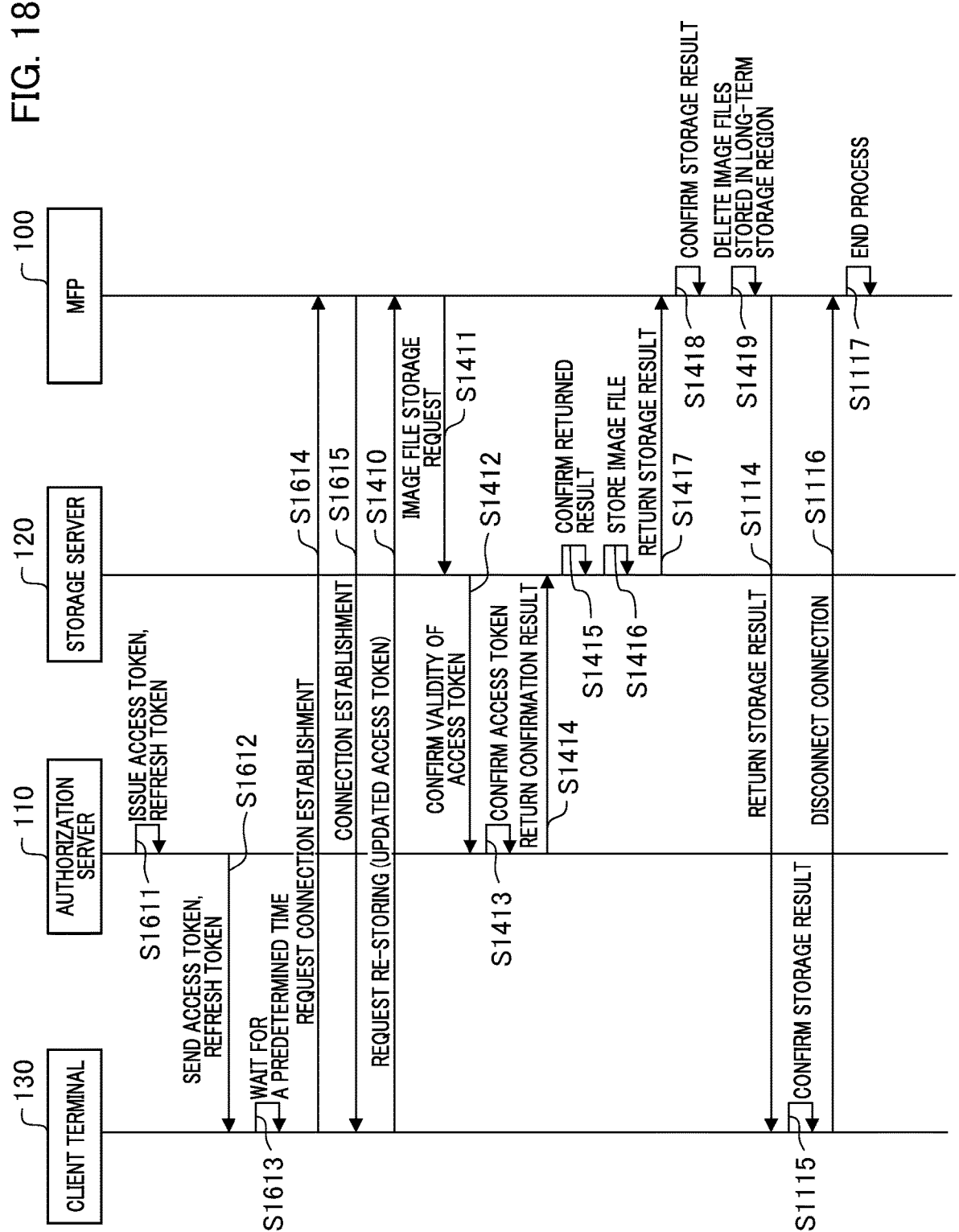
FIG. 18 is a sequence diagram of an example in which a reservation scan is executed in the MFP, and storage of the scanned file on a storage server fails (long time to recover from error).

FIG. 17 and FIG. 18 are sequence diagrams of an example in which the MFP 100 executes reservation scanning and storage of the scanned file on the storage server 120 fails (long time to recover from error). Specifically, this is an example of the case in which storage of the image file on the storage server 120 fails and it is determined that it will take a long time to recover from an error. Since the processes from S1101 to S1404 in which the storage result of the image file that has been returned from the MFP 100 is confirmed on the client terminal 130 in FIG. 14 and FIG. 15 are the same as those in FIG. 17 and FIG. 18, the same reference numerals are provided, and the explanation will be omitted. Additionally, since the processes following S1410, in which the client terminal 130 requests the MFP 100 to restore the image file are also the same as those in FIG. 17 and FIG. 18, the same reference numerals are provided, and the explanation will be omitted. In the present embodiment, all of the software executed in the MFP 100 shown in FIG. 17 and FIG. 18 is executed after the CPU 201 reads the program that is stored in the Flash ROM 210 into the DRAM 202. All the software executed by the client terminal 130 in FIG. 17 and FIG. 18 is executed after the CPU 401 reads the program that is stored in the Flash ROM 406 into the DRAM 402. All the software executed by the authorization server 110 and the storage server 120 in FIG. 17 and FIG. 18 is executed after the CPU 301 reads the program that is stored in the HDD 306 into the DRAM 302. This flow starts when the MFP 100 starts reservation scan processing.

In S1404, the reservation scan application 131 of the client terminal 130 confirms the storage result of the image file that has been notified from the MFP 100. In this sequence, it is determined that it takes a long time to recover from an error due to the error reason. For example, there is a case in which a network failure occurs.

Since it takes time to recover from the error, in S1601, the reservation scan application 131 on the client terminal 130 temporarily discards the connection with the MFP 100 established in S605.

Since the processes of issuing an access token from S1602 to S1612 are the same as the operation corresponding to S701 to S711 in the sequence diagram in FIG. 7, the explanation will be omitted.

In S1613, the reservation scan application 131 on the client terminal 130 waits for a predetermined period of time according to the error reason. In this sequence, since it takes a long time to eliminate the error, a time that is sufficient to eliminate the error is waited for.

In S1614 and S1615, a connection is established between the client terminal 130 and the MFP 100. Since these are the same as S604 and S605 in the sequence of FIG. 6, the explanation will be omitted.

The steps following S1410 for instructing retransmission to the storage server 120 are the same as the sequence in FIG. 14.

Figure 19A:
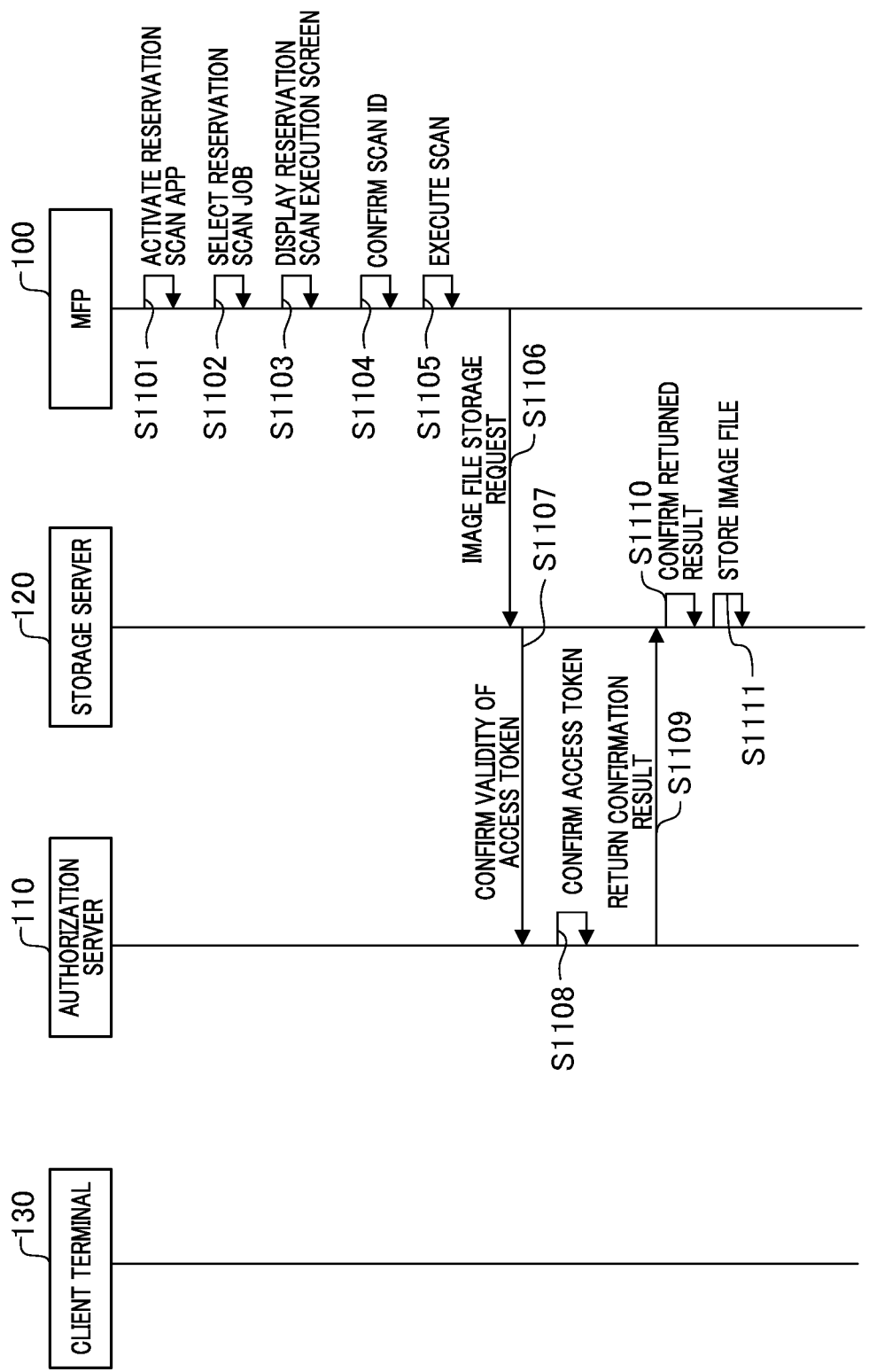
FIGS. 19A and 19B are sequence diagrams of an example in which a reservation scan is executed in the MFP, and storage of the scanned file on a storage server fails (error recovery is not possible).
Figure 19B:
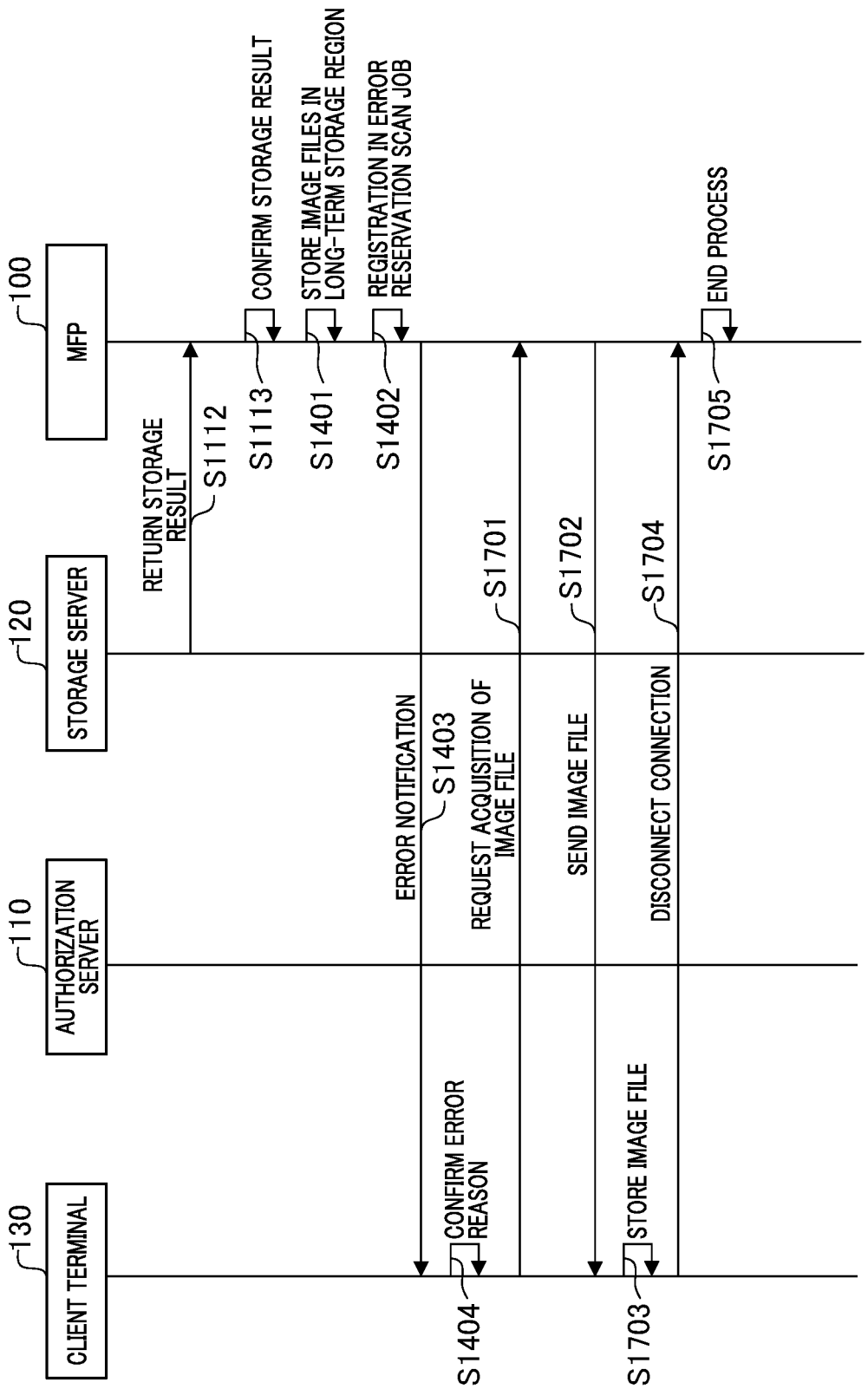

FIG. 19 is a sequence diagram of an example in which an reservation scan is executed in the MFP 100, and storage of the scanned file on the storage server 120 fails (recovery from an error is not possible). Specifically, this is an example in which the storage of a file on the storage server 120 fails and it is determined that there is no possibility of recovery from an error. Since the processes from S1101 to S1404, in which the storage result of the image file returned from the MFP 100 is confirmed on the client terminal 130 in FIG. 14 and FIG. 15, are the same as those in FIG. 19, the same reference numerals are provided, and the explanation will be omitted. In the present embodiment, all the software that is executed in the MFP 100 of FIG. 19 is executed after the CPU 201 reads the program that is stored in the Flash ROM 210 into the DRAM 202. All the software executed in the client terminal 130 in FIG. 19 is executed after the CPU 401 reads the program that is stored in the Flash ROM 406 into the DRAM 402. All the software executed in the authorization server 110 and the storage server 120 in FIG. 19 is executed after the CPU 301 reads the program that is stored in the HDD 306 into the DRAM 302. This flow starts when the MFP 100 starts reservation scan processing.

In S1404, the reservation scan application 131 of the client terminal 130 confirms the storage result of the image file for which notification has been provided from the MFP 100. In this sequence, it is determined that there is no possibility of recovery due to the error reason. For example, there is the case in which the directory at the storage destination has already been deleted and no longer exists.

In S1701, the reservation scan application 131 on the client terminal 130 requests the MFP 100 to acquire the image file.

In S1702, the reservation scan control unit 508 of the MFP 100 transmits the scanned image file to the client terminal 130.

In S1703, the reservation scan application 131 on the client terminal 130 stores the image file received from the MFP 100 in the client terminal 130.

Since, in S1704, the image file has been successfully stored in the client terminal 130, the reservation scan application 131 on the client terminal 130 discards the connection established in S605.

In S1705, the reservation scan control unit 508 of the MFP 100 performs end processing. In the end processing, the image files stored in the temporary region of the image storage 106 are deleted and the reservation scan job is deleted.

Figure 20:
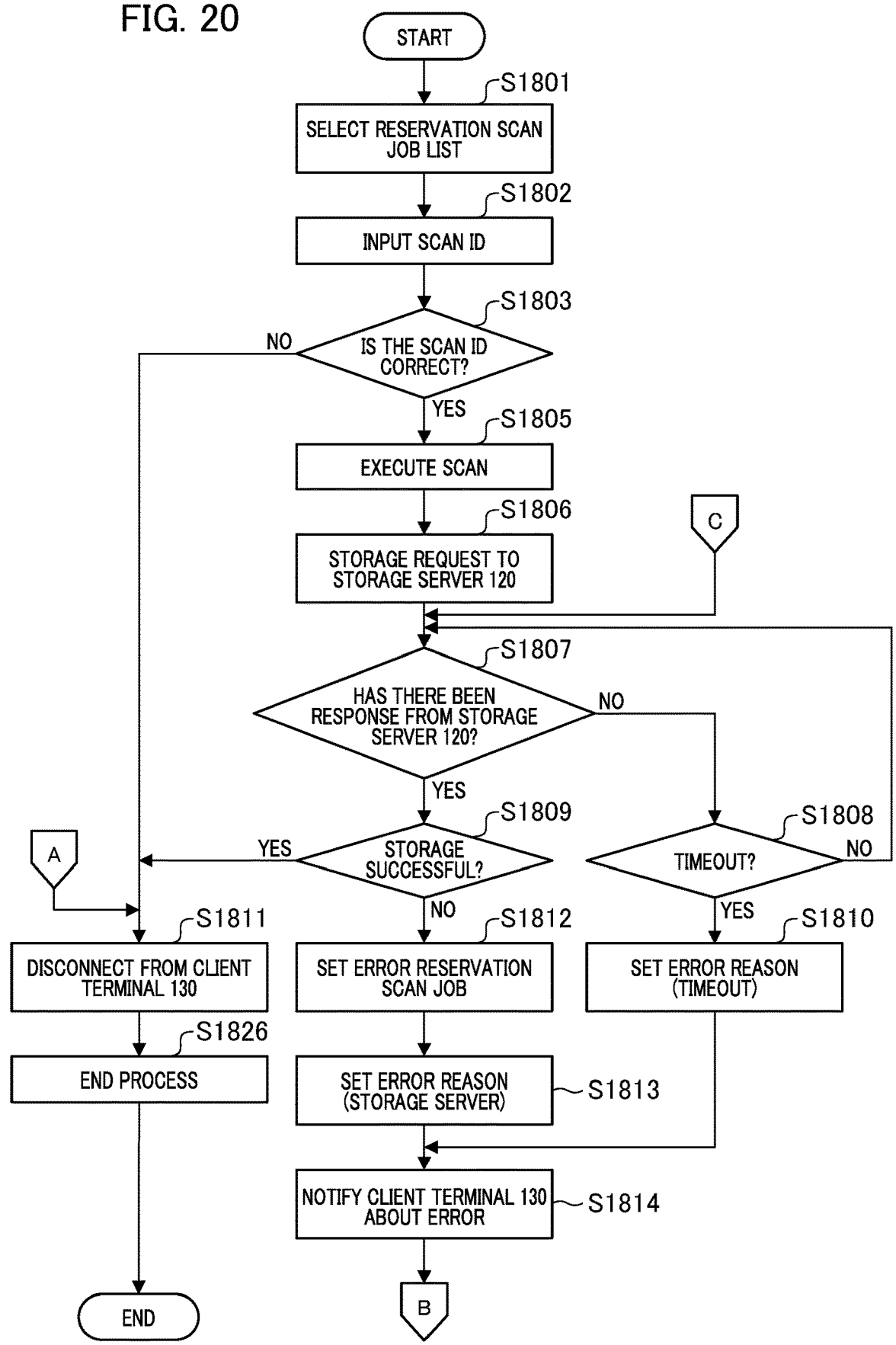
FIG. 20 is a flow chart of processing of the MFP in the first embodiment.
Figure 21:
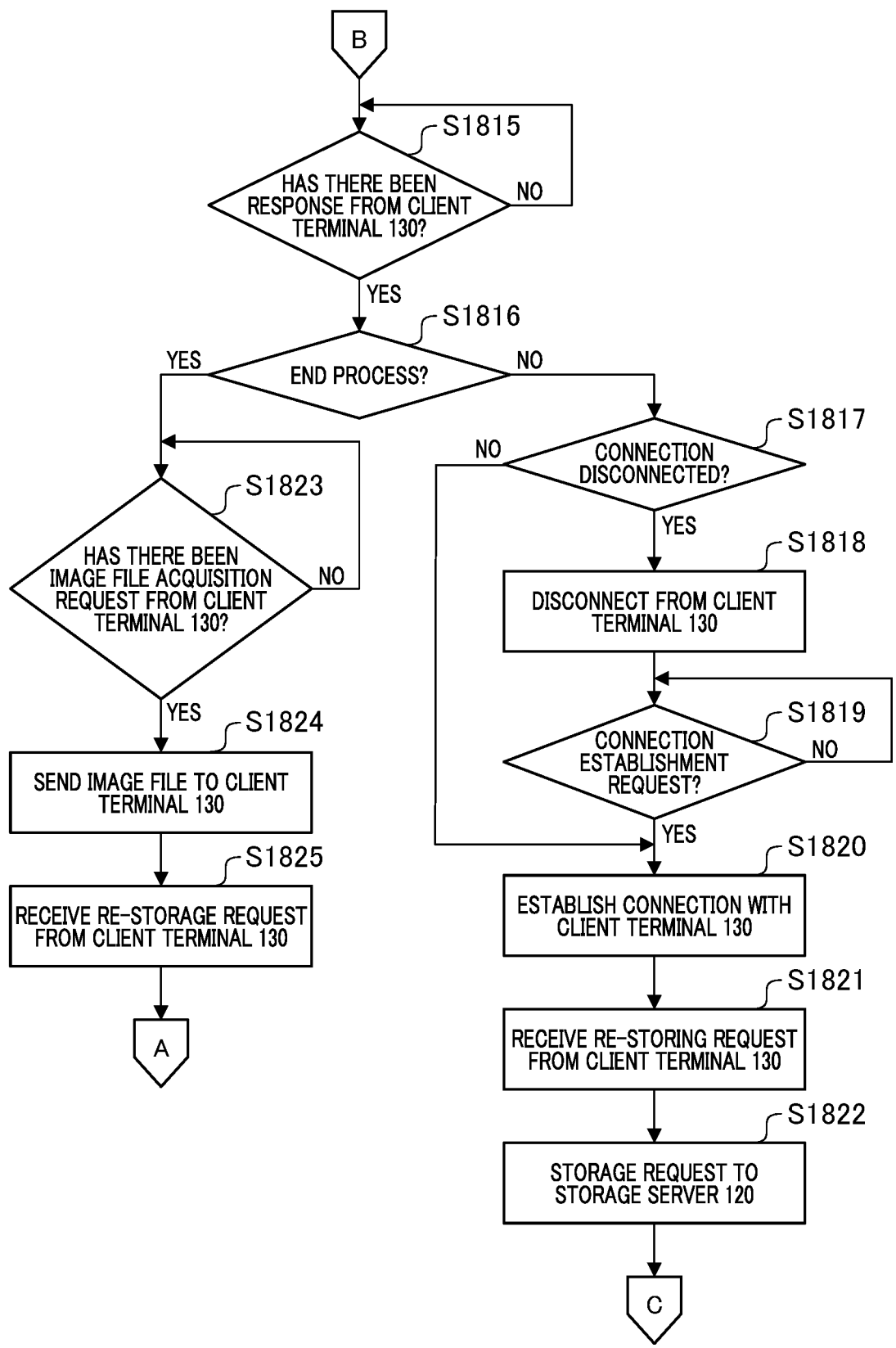
FIG. 21 is a flowchart of processing of the MFP in the first embodiment.

The processing of the MFP 100 in the present embodiment will be described with reference to flowcharts of FIG. 20 and FIG. 21. FIG. 20 and FIG. 21 are flowcharts of the processing of the MFP 100 in the first embodiment. In the present embodiment, all the software executed in the MFP 100 in FIG. 20 and FIG. 21 is executed after the CPU 201 reads the program that is stored in the Flash ROM 210 into the DRAM 202. This flow starts when the user executes the reservation scan application 131 in the MFP 100.

In S1801, the reservation scan control unit 508 of the MFP 100 instructs the operation control unit 501 to display the list of reservation scan jobs on the operation unit 102 and receive user selection. For example, the reservation scan job selection screen in FIG. 12 is displayed.

In S1802, the reservation scan control unit 508 of the MFP 100 instructs the operation control unit 501 to display an input screen for the scan ID of the reservation scan job received in S1801 on the operation unit 102, and receives an input from the user. For example, the reservation scan execution screen in FIG. 13 is displayed.

In S1803, the reservation scan control unit 508 of the MFP 100 determines whether or not the scan ID received in S1802 matches the scan ID of the reservation scan job selected in S1801. Specifically, among the reservation scan job settings in FIG. 9 stored in the MFP 100, the scan ID of the reservation scan job selected in S1801 and the scan ID input in S1802 are compared. If it is determined in S1803 that the scan IDs do not match (NO), the process proceeds to S1811. If it is determined that the scan IDs match (YES), the process proceeds to S1805. Note that, if the determination in S1803 is "NO", the reservation scan control unit 508 of the MFP 100 may perform error processing because the scan IDs do not match (S1804: not illustrated), and may end the processing.

In S1805, the reservation scan control unit 508 of the MFP 100 instructs the reading processing unit 506 to operate the scanner section 104 and read the original, thereby generating an image file. At this time, this is performed according to the scan setting specified in the reservation scan job setting in FIG. 9 that is stored in the MFP 100. Scanning a document and generating an image file is a known technology.

In S1806, the reservation scan control unit 508 of the MFP 100 issues a storage request to the storage server 120. The storage request includes a path to the storage server 120 and the access token specified in the reservation scan job settings in FIG. 9 that is stored in the MFP 100, and the image file generated in S1805.

In S1807, the reservation scan control unit 508 of the MFP 100 confirms whether or not there has been a response from the storage server 120 via the network control unit 507. If there has not been a response from the storage server 120 (NO), the process proceeds to S1808, and if there is a response from the storage server 120 (YES), the process proceeds to S1809.

In S1808, the reservation scan control unit 508 of the MFP 100 confirms whether or not a predefined timeout has been reached. If the timeout has not been reached (NO), the process returns to S1807. If the timeout has been reached (YES), the process proceeds to S1810. In S1810, the reservation scan control unit 508 of the MFP 100 sets a timeout as an error reason to return to the client terminal 130, the process proceeds to S1814.

In S1809, the reservation scan control unit 508 of the MFP 100 confirms whether or not the response from the storage server 120 is that the image file has been stored successfully. If the image file has been stored successfully (YES), the process proceeds to S1811, and if the file storage has failed (NO), the process proceeds to S1812.

In S1811, the reservation scan control unit 508 of the MFP 100 uses the network control unit 507 to delete the connection with the client terminal 130. In S1826, the reservation scan control unit 508 of the MFP 100 performs the end processing and ends the processing. As explained above, in the end processing, the image files stored in the temporary region and long-term storage region of the image storage 106 of the MFP 100 are deleted, and the reservation scan job error reservation scan job is deleted, as described above. Although the process in this flowchart ends in S1826, it may be, for example, in such a form that the process returns to S1801 after "NO" in S1803 and the reservation scan control unit 508 prompts the user to input the scan ID again or select another reservation scan job.

In S1812, the reservation scan control unit 508 of the MFP 100 sets the scan job as an error reservation scan job because storage of the image file on the storage server 120 has failed. Specifically, the reservation scan job is added to the error reservation scan job list as shown in FIG. 16, and the image file generated in S1805 is stored in the long-term storage region of the image storage 106.

In S1813, the reservation scan control unit 508 of the MFP 100 sets an error reason that has been received from the storage server 120 in S1807 to an error reason to be returned to the client terminal.

In S1814, the reservation scan control unit 508 of the MFP 100 uses the network control unit 507 to provide a notification regarding the error to the client terminal 130. At this time, the error reasons set in S1810 or S1813 are included in the notification.

In S1815, the reservation scan control unit 508 of the MFP 100 confirms whether or not there has been a response from the client terminal 130 via the network control unit 507. If there has not been a response from the client terminal 130 (NO), the process returns to S1815, and the process waits until a response is returned. If there is a response from the client terminal 130 (YES), the process proceeds to S1816.

In S1816, the reservation scan control unit 508 of the MFP 100 determines whether or not the response from the client terminal 130 ends in an error. If it is determined that the response is not ending in an error (NO), the process proceeds to S1817, and if it is determined that the response is an error exit (YES), the process proceeds to S1823. The cases of an error exit (YES in S1816) include the case in which, for example, the storage of the image file on the storage server 120 fails (recovery from an error is not possible), as explained in FIG. 19.

In S1817, the reservation scan control unit 508 of the MFP 100 confirms whether or not there is a connection deletion request from the client terminals 130 via the network control unit 507. If the client terminal 130 determines that it will take a long time to recover from an error, it issues a connection deletion request, and if it determines that it will not take a long time to recover from an error, it does not issue the connection deletion request. When the connection deletion request is issued (YES), the process proceeds to S1818, and when the connection deletion request is not issued (NO), the process proceeds to S1821.

In S1818, the reservation scan control unit 508 of the MFP 100 uses the network control unit 507 to delete the connection with the client terminal 130.

In S1819, the reservation scan control unit 508 of the MFP 100 confirms whether or not a connection establishment request has been issued from the client terminal 130 via the network control unit 507. When it is determined that recovery from an error is possible on the client terminal 130, the connection establishment request is transmitted from the client terminal 130. When the connection establishment request is issued (YES), the process proceeds to S1820, and when the connection establishment request is not issued (NO), the process returns to S1819, and the confirmation is performed again.

In S1820, the reservation scan control unit 508 of the MFP 100 establishes a connection with the client terminal 130 via the network control unit 507.

In step S1821, the reservation scan control unit 508 of the MFP 100 receives a request for restoring an image file on the storage server 120 from the client terminal 130 via the network control unit 507. The updated access token is included in the request for restoring the image file on the storage server 120.

In S1822, the reservation scan control unit 508 of the MFP 100 issues a request for storing an image file on the storage server 120, and the process returns to S1807. The request for storage includes the path to the storage server 120 specified in the reservation scan job setting in FIG. 9 that is stored in the MFP 100, the updated access token acquired in S1821, and the image file stored in S1812.

In S1823, the reservation scan control unit 508 of the MFP 100 confirms whether or not an image acquisition request has been issued from the client terminal 130 via the network control unit 507. If the image acquisition request has been issued (YES), the process proceeds to S1824, and if the image acquisition request has not been issued (NO), the process returns to S1823. Although in this flowchart, a mode is used in which the reservation scan control unit 508 continues to wait until an image acquisition request is issued, other modes, for example, the client terminal 130 does not acquire an image and the process ends as an error or the process ends due to time-out after a certain period of time, may be used.

In S1824, the reservation scan control unit 508 of the MFP 100 transmits the image file to the client terminal 130 via the network control unit 507.

In S1825, a re-storage request from the client terminal 130 is received. Subsequently, the process proceeds to step S1811, and the reservation scan control unit 508 of the MFP 100 disconnects the connection with the client terminal 130 via the network control unit 507.

Figure 22:
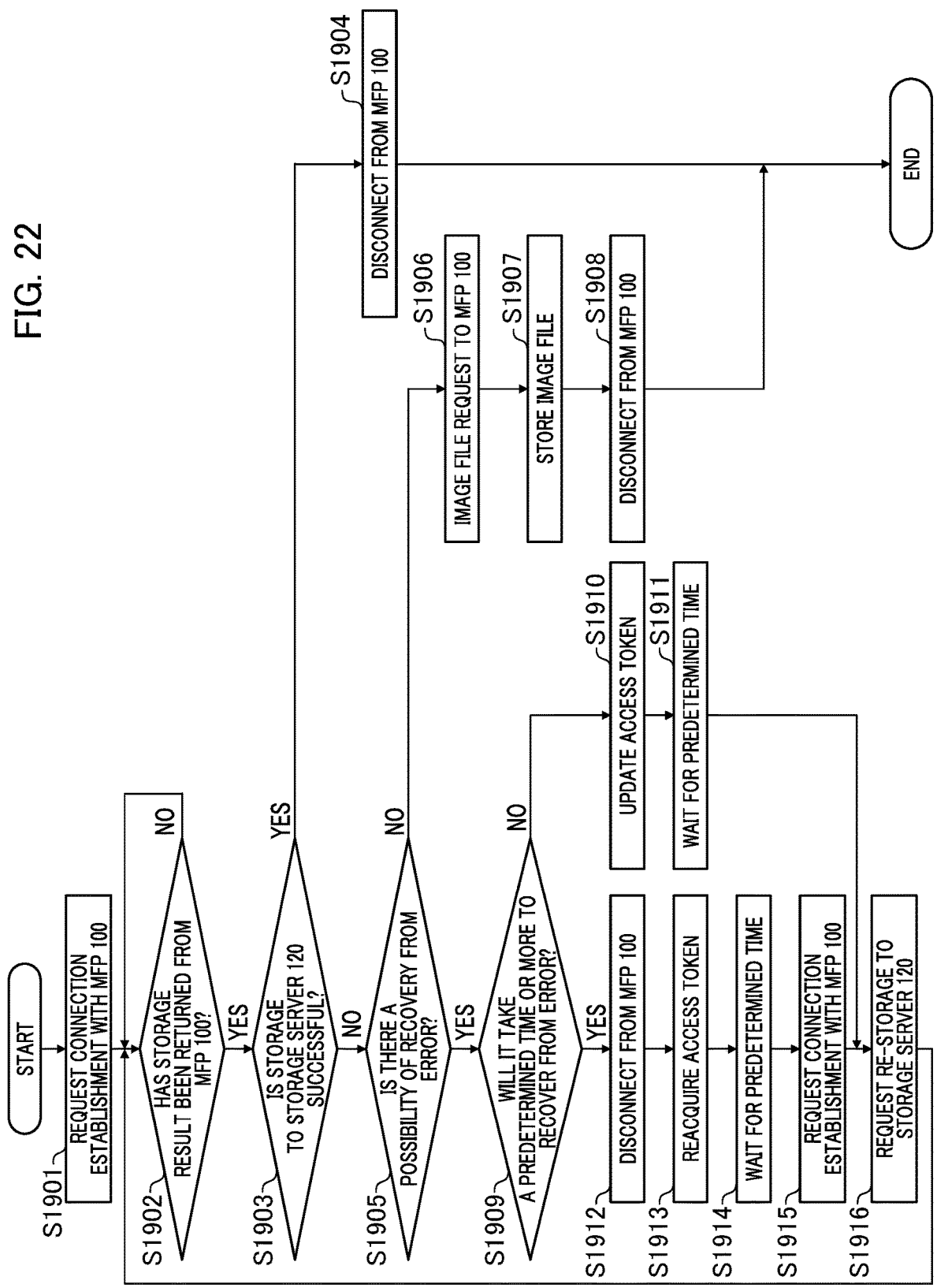
FIG. 22 is a flow chart of the processing of client terminal in the first embodiment.

FIG. 22 is a flowchart of the processing of the client terminal 130 in the first embodiment. In the present embodiment, all the software executed on the client terminal 130 in FIG. 22 is executed after the CPU 401 reads the program that is stored in the Flash ROM 406 into the DRAM 402. When the user inputs a reservation scan job to the MFP 100 to the reservation scan application 131 on the client terminal 130, this flow starts.

In S1901, the reservation scan application 131 on the client terminal 130 requests a connection establishment with the MFP 100.

In S902, the reservation scan application 131 on the client terminal 130 confirms whether or not the storage result of the reservation scan image file has been returned from the MFP 100. If the storage result of the reservation scan has not been returned (NO), the process returns to S1902 and the process is repeated until the storage result is returned. If the storage result of the reservation scan image file has been returned (YES), the process proceeds to S1903. In the storage result of the image file, the result as to whether or not the storage of the image file has succeeded or failed is included, and if the storage of the image file has failed, the reason for the failure is included.

In S1903, the reservation scan application 131 on the client terminal 130 confirms the storage result of the image file received in S1902, and confirms whether or not the image file has been successfully stored on the storage server 120. If the image file has been successfully stored in the storage server 120 (YES), the process proceeds to S1904. If the storage of the image file on the storage server 120 has failed (NO), the process proceeds to S1905.

Since, in S1904, the image has been successfully stored on the storage server 120, the reservation scan application 131 on the client terminal 130 issues a connection disconnecting request to the MFP 100, and the process ends.

In S1905, the reservation scan application 131 on the client terminal 130 confirms the reason for failure in the storage result of the image file that has been received in S1902, and determines whether or not there is a possibility of recovery from an error. Specifically, an error determination table in FIG. 23 is referred to. FIG. 23 is a diagram showing an example of an error determination table. In the example in FIG. 23, an error reason (reason for failure) 2001, an error recovery criterion 2002, and an estimated time 2003 for recovering from an error are described. The error recovery criterion 2002 includes "there is no possibility of recovery from an error" indicating that recovery from an error is difficult, "short time" indicating that recovery from an error is possible in a short time, and "long time" indicating that it takes a long time to recover from an error. The reservation scan application 131 compares the reason for failure in the storage result of the image file that has been received in S1902 and the error recovery criterion 2002, and determines whether or not" there is a possibility of recovery from an error. When it is determined that there is no possibility of recovery from an error (NO), the process proceeds to S1906. When it is determined that there is a possibility of recovery from an error (YES), the process proceeds to S1909. Note that FIG. 23 is an example for explaining the present embodiment, and the process until recovery from an error may be further divided in detail, or it may be determined based on the specific estimated time 2003 required for recovery from an error.

In S1906, the processing in the case in which there is no possibility of storing the image file on the storage server 120 is performed. Specifically, the reservation scan application 131 on the client terminal 130 issues an acquisition request of an image file of the reservation scan job to the MFP 100, and acquires an image file.

In S1907, the reservation scan application 131 on the client terminal 130 stores the image file acquired in S1906 inside the client terminal 130.

In S1908, the reservation scan application 131 on the client terminal 130 issues a connection disconnecting request to the MFP 100, and the process ends.

In S1909, the reservation scan application 131 on the client terminal 130 confirms the reason for failure in the storage result of the image file that has been received in S1902, and determines whether or not it will take a long time to recover from an error. Specifically, the error determination table in FIG. 23 as described above is referred to. The reservation scan application 131 compares the reason for failure in the storage result of the image file received in S1902 and the error recovery criterion 2002 and determines whether or not a time to recover from an error is a "long time.". When it is determined that it will not take a long time to recover from an error (NO), the process proceeds to S1910. When it is determined that it will take a long time to recover from an error (YES), the process proceeds to S1912.

In S1910, the reservation scan application 131 on the client terminal 130 requests the authorization server 110 to update the access token. Specifically, since it is determined that it will not take a long time to recover from an error, update of the access token is performed by using a refresh token. The means in S1910 is an example, and the access token may be updated by another method.

In S1911, the reservation scan application 131 on the client terminal 130 performs wait processing for a certain period of time according to the reason for failure in the storage result of the image file received in S1902, and the process proceeds to S1916. Specifically, FIG. 23 shows waiting for an estimated time 2003 required for recovery from an error, which corresponds to the reason for the failure in the storage result received at S1902.

Since it will take a time to recover from an error, in S1912, the reservation scan application 131 on the client terminal 130 temporarily disconnects the connection with the MFP 100.

In S1913, the reservation scan application 131 on the client terminal 130 requests the authorization server 110 to update the access token. Specifically, since it will take a time to recover from an error, an access token may be acquired again (reacquired), or the access token may be updated by using a refresh token if there is a refresh token that is valid until recovery from an error.

In S1914, the reservation scan application 131 on the client terminal 130 performs wait processing for a certain period of time according to the reason for failure in the storage result of the image file that has been received in S1902. Specifically, FIG. 23 shows waiting for an estimated time 2003 until recovery from an error, which corresponds to the reason for the failure in the storage result received at S1902.

In S1915, the reservation scan application 131 on the client terminal 130 requests a connection establishment with the MFP 100.

In S1916, the reservation scan application 131 on the client terminal 130 requests the MFP 100 to restore the image file on the storage server 120, and the process returns to S1902. In S1902, a transmission of the storage result of the image file from the MFP 100 is waited for again. The access token updated in S1910 or S1913 is included in this request.

Note that, although, in the flowchart in FIG. 22, before a wait for a certain period of time in S1914, reacquisition of the access token is performed in S1913, the reacquisition may be executed after S1914. Additionally, when the access token acquired in S1913 expires after the wait for a certain time-period in S1914, update of the access token may be performed using a refresh token. Alternatively, a mode may be adopted in which the valid time-period of the refresh token is confirmed, and the access token is reacquired only when the valid time-period expires. That is, the timing of update of the access token in FIG. 22 is an example, and another timing may be adopted if the acquisition and update of the access token in which recover from the error is possible are performed.

According to the flow as described above, even if, in the reservation scan, an error occurs in storage of image files on the storage server 120, the convenience of the MFP 100 can be improved by performing recovery from an error. Specifically, it becomes possible to update the access token and restore the image file on the storage server 120, depending on the reasons for the error. Additionally, when the image file cannot be stored on the storage server 120, the client terminal 130 can acquire the scanned image file.

Second Embodiment

Hereinafter, the embodiments of the present invention will be explained below based on drawings. Contents that are similar to those described above are denoted by the same reference numerals, and explanation thereof will be omitted. In the present embodiment, when an error occurs in storing an image file on the storage server 120 including cloud storage and the like, an error notification is provided by mail (e-mail) without using the connection between the client terminal 130 and the MFP 100. According to the present embodiment, the connection between the client terminal 130 and the MFP 100 during occurrence of the error becomes unnecessary, and the communication between the client terminal 130 and the MFP 100 becomes simple and the realization is easy.

FIG. 24 is a diagram illustrating an example of texts of e-mail that are transmitted when an error occurs in the storage on the storage server 120 according to the second embodiment. Specifically, this is an example of texts of mail that are transmitted from the MFP 100 to the client terminal 130 when an error occurs in storing the image file on the storage server 120. The URL of the storage destination of the image in the file server made public by the MFP 100 is disclosed in the mail. The user who has received the mail can acquire the image file by accessing the URL disclosed in the mail. In the setting in FIG. 25 to be described below, the storage destination of the image file may not be included in the texts of the mail.

FIG. 25 is a diagram illustrating an example of a reservation scan setting screen that is displayed on the client terminal 130. The reservation scan setting screen is displayed on the reservation scan application 131 of the client terminal 130. The same components as those in FIG. 8 are denoted by the same numerals, and explanation thereof will be omitted. A check box 2201 is a check box that determines whether or not to store an image when an error occurs during reservation scan. This setting becomes part of the scan setting that is used as an error-time image storage flag. When the check box 2201 is checked, the error-time image storage flag becomes valid so that an image file is stored in the MFP 100 when an error occurs, and the acquisition is possible. When the check box 2201 is not checked, the image file scanned during the occurrence of error is not stored, and the error-time image storage flag becomes invalid so that notification is provided only about the error occuring. An e-mail address field 2202 is an e-mail address field. By inputting an e-mail address in the email address field 2202, the MFP 100 provides an error notification via the e-mail when an error occurs during a reservation scan. The e-mail address is also part of the scan settings.

In the present embodiment, the e-mail address field 2202 is provided. However, the present invention is not limited thereto, and an e-mail address may be registered in advance in the settings of the reservation scan application 131 so that input of the e-mail address on the reservation scan setting screen in FIG. 25 is eliminated. Since the error-time image storage flag and the e-mail address are part of the scan settings, they are included in the reservation scan instruction in the sequence 606 of FIG. 6, and transmitted from the client 130 to the MFP 100.

Figure 26:
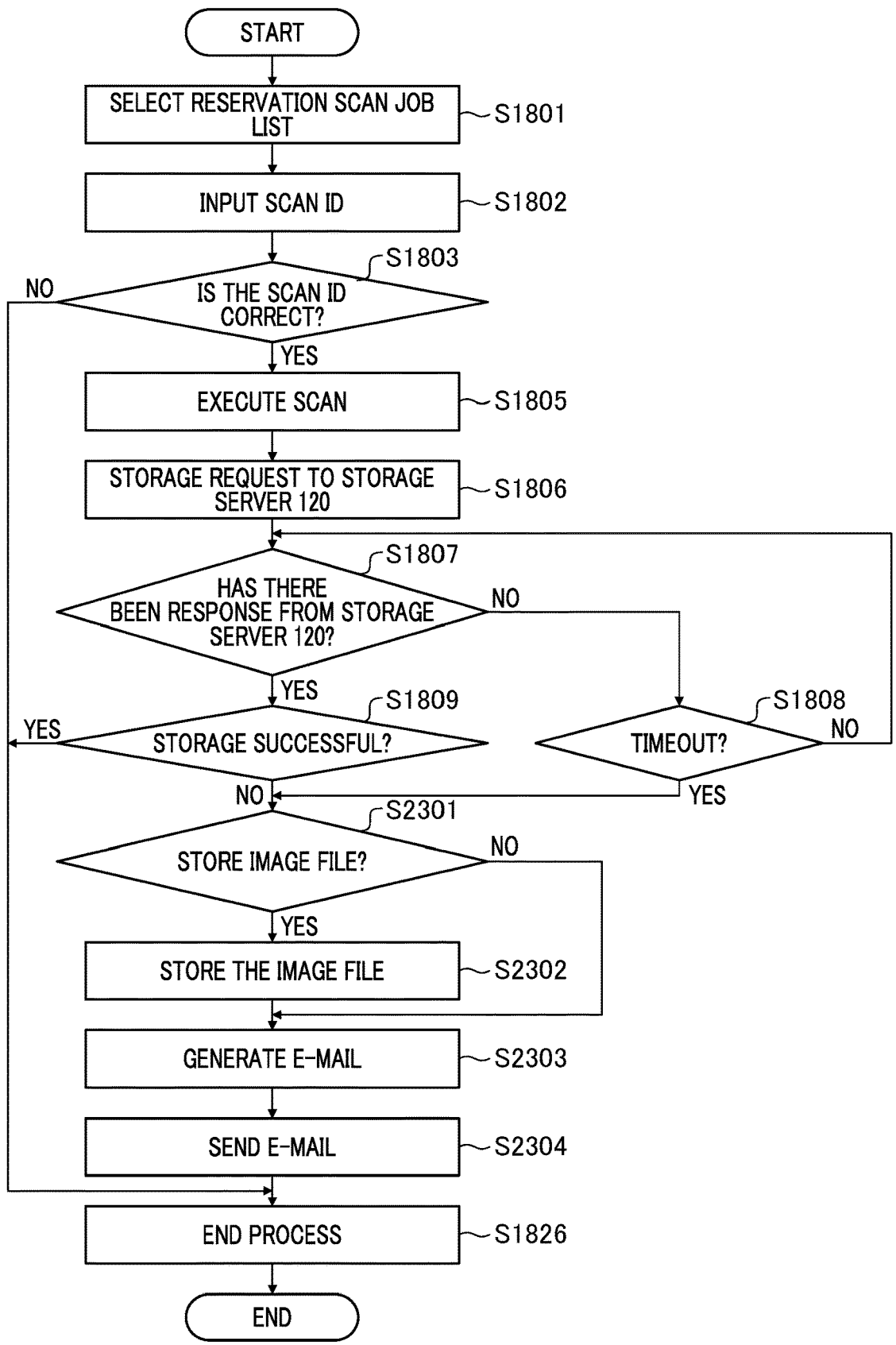
FIG. 26 is a flow chart of the processing of the MFP in the second embodiment.

FIG. 26 is a flowchart of the processing of the MFP 100 according to the second embodiment. The flowchart in FIG. 26 shows the processing in which the MFP 100 transmits an error notification by e-mail when an error occurs in storing the image file on the storage server 120. In the present embodiment, all the software executed in the MFP 100 in FIG. 26 is executed after the CPU 201 reads the program that is stored in the Flash ROM 210 into the DRAM 202. This flow starts when the user executes the reservation scan application 131 in the MFP 100. In FIG. 26, the same processes as those in FIG. 20 and FIG. 21 are denoted by the same reference numerals, and explanation thereof will be omitted.

When, in S1803, it is not determined that the scan ID is correct (NO), and when, in S1809, the storage of the image file is successful (YES), the process proceeds to S1826. Additionally, when, in S1808, time-out is determined (YES), and when, in S1809, the storage of the image file is unsuccessful (NO), the process proceeds to S2301.

Since storage in the storage server 120 fails, in S2301, the reservation scan control unit 508 in the MFP 100 determines whether or not to store the image file. Specifically, whether or not to store the image file is determined based on whether or not the error-time image storage flag set in FIG. 25 in the client terminal 130 is valid. If the error-time image storage flag is valid, the image file is stored (YES), and the process proceeds to S2302. If the error-time image storage flag is invalid, the image file is not stored (NO), and the process proceeds to S2303.

In S2302, the reservation scan control unit 508 of the MFP 100 stores the image file generated in the S1805 in the long-term storage region of the image storage 106. The storage destination of the long-term storage region of the image storage 106 is made public by a protocol that is accessible from the outside, for example, SMB and Web-DAV.

In S2303, the reservation scan control unit 508 of the MFP 100 generates an e-mail. When, in S2301, storage of the image file is determined, in S2302, an externally accessible URL for the image file stored in the long-term storage region of the image storage 106 is included in the body text.

In S2304, the reservation scan control unit 508 of the MFP 100 instructs a mail server (not illustrated) to transmit the mail generated in S2303 via the network control unit 507, and the processing ends. As the destination of e-mail, the e-mail address input in the mail address field 2202 in FIG. 25 for which notification has been provided as the scan setting from the client 130 to the MFP 100 is specified. Hence, when the transmission of the image file to the transmission destination fails, the reservation scan control unit 508 in the present embodiment provides an error notification to the e-mail address of the user who has instructed the storage of the stored data by using the electronic mail.

Figure 27:
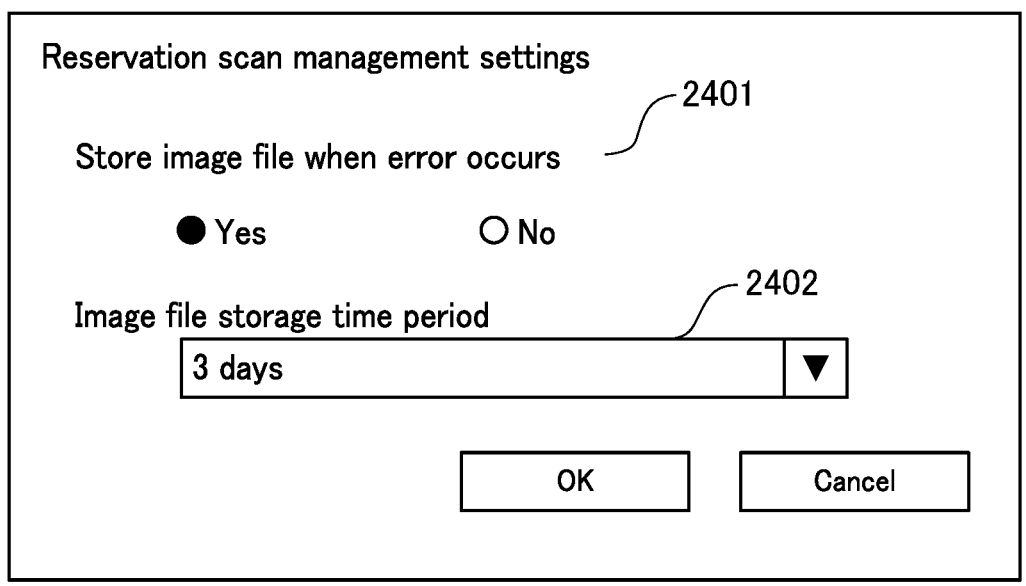
FIG. 27 is a diagram showing an example of a setting screen on the reservation scan application of the MFP.

Although, in the present embodiment, the valid time period of the image file stored in S2302 is not specified, the time period for storing the image file may be set as the setting of the reservation scan application of the MFP 100. FIG. 27 is a diagram showing an example of the setting screen of the reservation scan application 131 in the MFP 100. For example, an administrator of the MFP 100 can perform the setting on the setting screen as shown in FIG. 27. A setting 2401 is a setting as to whether or not to permit storage of the image file during occurrence of an error. When the setting is such that storage of the image file is not permitted during occurrence of an error, the check box 2201 that determines whether or not to store the image file when an error occurs during reservation scan in FIG. 25 described above is not displayed. A storage time-period 2402 is a time-period during which the image file is stored in a case in which storage of the image file is permitted during the occurrence of an error. When the time-period specified here elapses, the reservation scan control unit 508 in the MFP 100 deletes the image file that is stored in the long-term storage region of the image storage 106.

Although, in the present embodiment, an example has been described in which the client terminal 130 can acquire an image file by accessing a URL in an e-mail, other embodiments may be adopted. For example, a mode may be adopted in which, when the MFP 100 detects an access to the URL, the MFP 100 attempts to restore the image file on the storage server 120.

According to the flow as described above, when, in the reservation scan, an error occurs in storing an image file on the storage server 120, an error notification can be performed even if there is no connection between the MFP 100 and the client 130. Additionally, at that time, an image file in which an error has occurred in storage can be acquired on the client terminal 130.

Other Embodiments

Although the present invention has been described in detail based on the preferred embodiments, the present invention is not limited to these specific embodiments, and various modes within the scope not departing from the gist of the present invention are also included in the present invention. Additionally, some of the above-described embodiments may be combined as appropriate.

Although, in the above-described embodiments, the image processing apparatus is provided with the scanner, and the scanner of the image processing apparatus performs the scan processing that has been set in the reservation scan job, the present invention is not limited thereto. For example, when the image processing apparatus receives a scan job, scan processing may be performed by using an external scanner.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-114723, filed Jul. 19 2022, which is hereby incorporated by reference wherein in its entirety.

What is claimed is:

1. An image forming processing apparatus provided with a scanner comprising:
   a memory storing instructions; and
   a processor executing the instructions causing the image processing apparatus to:
   store data including a transmission destination to which an image generated by the scanner is to be transmitted and a first token that is used for storing the image in the transmission destination, wherein the first token has been issued by an authorization server;
   attempt to transmit an image generated by the scanner to a transmission destination included in the data using the first token in response to an instruction from a user;
   execute an error notification including information for causing authentication for reacquisition of another token if the transmission fails;
   receive a second token from a client terminal different from the authorization server, wherein, on the client terminal, the second token is reacquired according to authentication according to the error notification; and
   attempt to transmit an image generated by the scanner to the transmission destination included in the data by using the second token.

2. The image processing apparatus according to claim 1, wherein if the transmission fails, an image generated by the scanner is managed while being stored for retransmission and the processor attempts to transmit the image that is stored for retransmission by using the second token.

3. The image processing apparatus according to claim 1, wherein, if the transmission fails, the processor provides notification about the error notification to a mail address of a user who has instructed the storage of the stored data by using an electronic mail.

4. The image processing apparatus according to claim 1, wherein the error notification includes information on whether or not transmission of an image generated by the scanner to the transmission destination is possible, and information on a time required for transmission of an image generated by the scanner to the destination, if such transmission is possible.

5. The image processing apparatus according to claim 1, wherein the error notification includes identification information that identifies data including the first token stored in the image processing apparatus, which is used as information for causing authentication for reacquisition of the another token.

6. The image processing apparatus according to claim 1, wherein the client terminal is a smart phone or a personal computer.

7. A control method for an image processing apparatus provided with a scanner comprising:

storing data including a transmission destination to which an image generated by the scanner is to be transmitted, and a first token that is used for storing the image in the transmission destination, wherein the first token has been issued by an authorization server;

attempting to transmit an image generated by the scanner to a transmission destination included in the data by using the first token, in response to an instruction from a user;

executing an error notification including information for causing authentication for reacquisition of another token if the transmission fails;

receiving a second token from a client terminal different from the authorization server, wherein, on the client terminal, the second token is reacquired according to authentication according to the error notification; and attempting to transmit an image generated by the scanner to the transmission destination included in the data by using the second token.

8. A non-transitory storage medium storing a control program of an image processing apparatus provided with a scanner causing a computer to perform each step of a control method of the image processing apparatus, the method comprising:

storing data including a transmission destination to which an image generated by the scanner is to be transmitted, and a first token that is used for storing the image in the transmission destination, wherein the first token has been issued by an authorization server;

attempting to transmit an image generated by the scanner to a transmission destination included in the data by using the first token, in response to an instruction from a user;

executing an error notification including information for causing authentication for reacquisition of another token if the transmission fails;

receiving a second token from a client terminal different from the authorization server, wherein, on the client terminal, the second token is reacquired according to authentication according to the error notification; and attempting to transmit an image generated by the scanner to the transmission destination included in the data by using the second token.

* * * * *